United States Patent
Yamashita et al.

(10) Patent No.: US 9,680,575 B2
(45) Date of Patent: Jun. 13, 2017

(54) RELAY DEVICE, STATION SIDE DEVICE, AND COMMUNICATION SYSTEM AND COMMUNICATION METHOD USING RELAY DEVICE

(71) Applicant: SUMITOMO ELECTRIC INDUSTRIES, LTD., Osaka-shi, Osaka (JP)

(72) Inventors: Kazuhisa Yamashita, Osaka (JP); Toru Inoue, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 5 days.

(21) Appl. No.: 14/424,073

(22) PCT Filed: Aug. 21, 2013

(86) PCT No.: PCT/JP2013/072309
§ 371 (c)(1),
(2) Date: Feb. 26, 2015

(87) PCT Pub. No.: WO2014/034498
PCT Pub. Date: Mar. 6, 2014

(65) Prior Publication Data
US 2015/0326318 A1 Nov. 12, 2015

(30) Foreign Application Priority Data

Aug. 27, 2012 (JP) .................................. 2012-186267

(51) Int. Cl.
*H04B 10/27* (2013.01)
*H04B 10/29* (2013.01)
*H04L 12/46* (2006.01)
*H04Q 11/00* (2006.01)

(52) U.S. Cl.
CPC ............ *H04B 10/29* (2013.01); *H04B 10/27* (2013.01); *H04L 12/4625* (2013.01); *H04Q 11/0067* (2013.01); *H04Q 2011/0086* (2013.01)

(58) Field of Classification Search
None
See application file for complete search history.

(56) References Cited

U.S. PATENT DOCUMENTS

2009/0080890 A1* 3/2009 Miura .................... H04B 10/27
398/72
2014/0112656 A1 4/2014 Yamashita

FOREIGN PATENT DOCUMENTS

JP 2007-221688 A 8/2007
JP 2008-017264 A 1/2008
(Continued)

OTHER PUBLICATIONS

Yutaro Hara, et al., "A Study of Next Generation Metro-Access Hybrid Scalable Network by Using PLZT Ultra High Speed Optical Wavelength Selective Switch," IEICE Technical Report, Feb. 24, 2011, vol. 110, No. 448, pp. 13-18.
(Continued)

*Primary Examiner* — Darren E Wolf
(74) *Attorney, Agent, or Firm* — Drinker Biddle & Reath LLP

(57) ABSTRACT

A relay device includes a relay processing unit that relays a downstream frame received by a first transceiver to a second transceiver, and relays an upstream frame received by the second transceiver to the first transceiver; and a control unit that follows upstream multiple access control performed by a station side device in a first line, for transmission of the upstream frame to be transmitted by the first transceiver to the station side device, and independently performs upstream multiple access control for reception of the upstream frame received by the second transceiver from a home side device in a second line. The control unit reports an amount of data that the home side device in the second line will be allowed to transmit, to the station side device in the first line before the data arrives at the second transceiver.

9 Claims, 17 Drawing Sheets

(56) References Cited

FOREIGN PATENT DOCUMENTS

| | | |
|---|---|---|
| JP | 2013-031140 A | 2/2013 |
| WO | WO-2012/042674 A1 | 4/2012 |

OTHER PUBLICATIONS

IEEE Standards, "802.3ah™, IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks", IEEE Std 802.3ah™-2004 (Amendment to IEEE Std 802.3™-2002 as amended by IEEE Stds 802.3ae™-2002, 802.3af™-2002, 802.3aj™-2003 and 802.3ak™-2004), IEEE Computer Society, Sep. 7, 2004, pp. 1-623.

IEEE, "802.3av™, IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment 1: Physical Layer Specifications and Management Parameters for 10 Gb/s Passive Optical Networks", IEEE Std 802.3av™-2009 (Amendment of IEEE Std 802.3™-2008), IEEE Computer Society, Oct. 30, 2009, pp. 1-214.

\* cited by examiner

FIG. 15   CENTRALIZED DBA: WITH RESERVATION REPORT (WITH PHASE SHIFT)

RELAY DEVICE, STATION SIDE DEVICE, AND COMMUNICATION SYSTEM AND COMMUNICATION METHOD USING RELAY DEVICE

TECHNICAL FIELD

The present invention relates to a relay device for connecting communication networks in a multi-level manner that perform multiple access control of a polling scheme, e.g., PONs (Passive Optical Networks), a station side device used in a communication network on the upper-level side, and a communication system and a communication method using the relay device.

BACKGROUND ART

A PON system is an optical communication system that performs optical splitting in a P2MP (Point to Multi Point) connection mode, with no power and includes a station side device; a single-core optical fiber network where an optical fiber connected to the station side device is split into a plurality of optical fibers through an optical coupler; and home side devices connected to ends of the split optical fibers, respectively.

In the PON system, NRZ (Non-Return to Zero) optical signals obtained by directly or externally modulating a light source such as a semiconductor laser are transmitted, by which information is sent and received.

A downstream optical signal sent from the station side device is transmitted to each home side device in broadcast form. Each home side device performs a reception process on only signals destined therefor. On the other hand, upstream optical signals from the home side devices are managed by the station side device using a time-division multiplexing scheme in order to prevent collisions. The station side device receives the upstream optical signals from the home side devices in a burst manner.

In such a PON system, the larger the number of splits and the transmission distance, the poorer the signal quality. Thus, the PON system is normally operated within 32 splits and within a transmission distance of 20 km.

In view of this, there is proposed a PON multiplexing relay device in which in order to extend the transmission distance between a station side device and home side devices as much as possible, eight G-EPONs are multiplexed into 10G by a pair of relay devices which face each other (see Patent Literature 1).

In addition, as another relay device that achieves the extension of the transmission distance, there is also already known a relay device that recovers and synchronizes an optical signal in G-EPON to an electrical signal and relays the optical signal (see Patent Literature 2).

CITATION LIST

Patent Literature

Patent Literature 1: Japanese Unexamined Patent Publication No. 2008-017264
Patent Literature 2: Japanese Unexamined Patent Publication No. 2007-221688

SUMMARY OF INVENTION

Technical Problem

The relay device described in the above-described Patent Literature 1 employs a scheme in which eight G-EPONs are put together into a 10G relay device. Thus, there are required station side devices, the number of which is equal to that of the G-EPONs, and there are also required interfaces with an upper network, the number of which is equal to that of the station side devices.

Therefore, although the transmission distance between the station side device and the home side devices can be extended, there is a drawback that the system as a whole is not economical.

The relay device described in the above-described Patent Literature 2 is to recover and synchronize an electrical signal obtained by photoelectrically converting a PON optical signal, at the physical layer level. It does not mean that the transmission rate increases upon relaying. Therefore, as with normal PON systems, there is a drawback that when the number of splits is increased, bandwidth decreases.

In addition, if the number of splits is increased, the bandwidth consumed by control messages increases and thus the overall bandwidth that can be used by user data decreases. Accordingly, bandwidth per user decreases, and in the upstream direction unavailable bandwidth for burst overhead increases, further decreasing bandwidth.

In view of this, in order that an optical communication system capable of increasing the number of splits while securing upstream bandwidth can be configured, the inventors of the present application has already proposed an optical communication system in which PONs are connected to each other in a multi-level manner by a relay device that functions as a home side device in an upper-level PON and functions as a station side device in a lower-level PON, and the relay device performs upstream multiple access control of the lower-level PON independently of upstream multiple access control of the upper-level PON performed by a station side device (see the specification of Japanese Patent Application No. 2011-136798).

However, in the communication system, such as the above-described optical communication system, in which the station side device in the upper-level PON and the relay device in the lower-level PON perform upstream multiple access control independently of each other, there is a problem of an increase in the overall upstream delay time of the system.

In view of such a conventional problem, an object of the present invention is to be able to reduce the overall upstream delay time of the system even when upstream multiple access control is performed independently in the upper- and lower-level communication networks.

Solution to Problem

A relay device of the present invention includes: a first transmitting and receiving unit that performs transmission and reception of signals to/from an upper-level first line; a second transmitting and receiving unit that performs transmission and reception of signals to/from a lower-level second line; a relay processing unit that relays a downstream frame received by the first transmitting and receiving unit to the second transmitting and receiving unit, and relays an upstream frame received by the second transmitting and receiving unit to the first transmitting and receiving unit; and a control unit that follows upstream multiple access control performed by a station side device in the first line, for transmission of the upstream frame to be transmitted by the first transmitting and receiving unit to the station side device, and independently performs upstream multiple access control for reception of the upstream frame received by the second transmitting and receiving unit from a home side device in the second line.

In this configuration, in the relay device of the present invention, the control unit reports an amount of data that the home side device in the second line is allowed to transmit, to the station side device in the first line before the data frame arrives at the second transmitting and receiving unit.

Advantageous Effects of Invention

According to the present invention, even when upstream multiple access control is performed independently in the upper- and lower-level communication networks, the overall upstream delay time of the system can be reduced.

DESCRIPTION OF EMBODIMENTS

Figure 1:
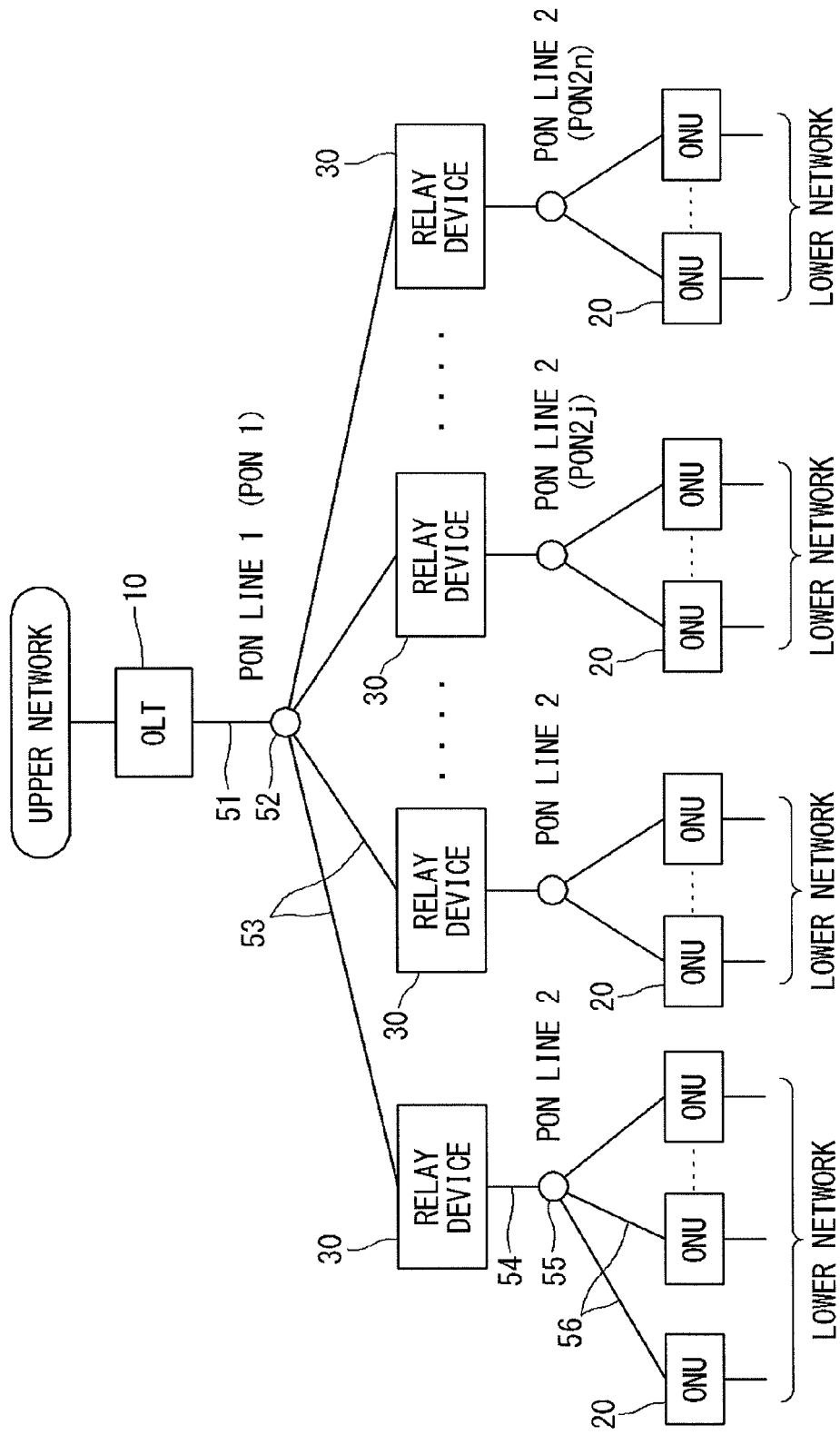
FIG. 1 is a diagram showing a connection mode of an optical communication system according to a first basic mode.

<Summary of an Embodiment of the Present Invention>

A summary of an embodiment of the present invention will be listed and described below.

(1) A relay device according to an embodiment of the present invention includes: a first transmitting and receiving unit that performs transmission and reception of signals to/from an upper-level first line; a second transmitting and receiving unit that performs transmission and reception of signals to/from a lower-level second line; a relay processing unit that relays a downstream frame received by the first transmitting and receiving unit to the second transmitting and receiving unit, and relays an upstream frame received by the second transmitting and receiving unit to the first transmitting and receiving unit; and a control unit that follows upstream multiple access control performed by a station side device in the first line, for transmission of the upstream frame to be transmitted by the first transmitting and receiving unit to the station side device, and independently performs upstream multiple access control for reception of the upstream frame received by the second transmitting and receiving unit from a home side device in the second line.

In this configuration, the relay device of the embodiment is characterized in that the control unit reports an amount of data that the home side device in the second line is or will be allowed to transmit, to the station side device in the first line before the data frame arrives at the second transmitting and receiving unit.

According to the relay device of the embodiment, as described above, the control unit reports the amount of data that the home side device in the second line will be allowed to transmit, to the station side device in the first line before the data arrives at the second transmitting and receiving unit. Thus, comparing to the case of not making such a report, the overall upstream delay time of the system can be reduced.

(2) In the relay device of the embodiment, when the relay processing unit has an upstream buffer that buffers upstream data, the control unit determines an amount of data that the home side device will be allowed to transmit, and then, may make a write reservation in the upstream buffer for the amount of data and may determine an amount of data to be reported to the station side device, based on an amount of buffer for which the write reservation is made.

In this case, the relay device that reports in advance the amount of data to be allowed for transmission, to the station side device before the data arrives at the second transmitting and receiving unit can be implemented by simple means.

(3) When the relay device of the embodiment is connected to the station side device that performs centralized DBA, it is preferred that the relay device of the embodiment perform centralized DBA having same cycles as the centralized DBA and having a phase matching that of the centralized DBA.

In this case, the overall upstream delay time of the system can be reduced by one cycle of the centralized DBA performed in the first line and the second line.

(4) In addition, when the relay device of the embodiment is connected to the station side device that performs centralized DBA, the relay device of the embodiment may perform centralized DBA having same cycles as the centralized DBA and having a phase delayed by predetermined allowance time from that of the centralized DBA.

In this case, the overall upstream delay time of the system can be further reduced by an amount corresponding to the predetermined allowance time by which the DBA cycle in the second line is delayed.

(5) A station side device of the embodiment is a station side device performing distributed DBA and connected to the relay device described in the above-described (1) or (2) performing distributed DBA, and is characterized by determining a reception start time for bandwidth to be allocated according to a bandwidth report received from a given logical link of the first line, based on a reception time of the bandwidth report, an upper limit value of a gate delay in the second line, and an upper limit value of back-and-forth propagation time of the second line.

According to the station side device of the embodiment, a reception start time for bandwidth to be allocated according to a bandwidth report received from a given logical link of the first line is determined based on the above-described values. Thus, a waste of the bandwidth of the first line can be prevented in advance which is caused by the station side device allowing the relay device, at which user data has not been arrived, to transmit the user data.

(6) A communication system of the embodiment is a communication system in which a first communication network having a master station device performing multiple access control of a polling scheme is connected to a second communication network having a relay device performing multiple access control of a polling scheme, through the relay device, and is characterized in that the relay device reports an amount of data to be allowed for transmission in the second communication network, to the master station device before the data frame arrives at the relay device.

According to the communication system of the embodiment, the relay device reports the amount of data to be allowed for transmission in the second communication network, to the master station device before the data arrives at the relay device. Thus, comparing to the case of not making such a report, the overall upstream delay time of the system can be reduced.

(7) A communication system of the embodiment viewed from another viewpoint is a communication system in which a first communication network having a master station device performing multiple access control of a polling scheme is connected to a second communication network having a relay device performing multiple access control of a polling scheme, through the relay device, and is characterized in that when the relay device reports a predetermined amount of data to the master station device, the relay device additionally reports an information completion time representing a time at which the amount of data reported will be actually accomplished, and the master station device allocates transmission allowance according to the amount of data reported by the relay device, after the information completion time.

According to the communication system of the embodiment, the relay device additionally reports the above-described information completion time when the relay device reports a predetermined amount of data to the master station device, and the master station device allocates transmission allowance according to the amount of data reported by the relay device, after the information completion time. Thus, while a waste of the bandwidth of the first communication network is prevented in advance, the overall upstream delay time of the multi-level communication system can be reduced.

(8) A communication method of the embodiment is a communication method performed by the communication system described in the above-described (6) and provides the same function and effect as the communication system.

(9) Another communication method of the embodiment is a communication method performed by the communication system described in the above-described (7) and provides the same functions and effects as the communication system.

<Details of the Embodiments of the Present Invention>

Details of the embodiments of the present invention will be described below based on the drawings.

Note that, in the following description, a mode in which the logical links of a PON line 1 (upper-level first line) and a PON line 2 (lower-level second line) have a "one-to-many" correspondence is referred to as the "first basic mode", and a mode in which the logical links have a "one-to-one" correspondence is referred to as the "second basic mode".

In addition, in the following description, for easy understanding of the embodiments of the present invention, specific details of the first and second basic modes in which both of the upper- and lower-level communication networks are PONs will be described first.

<First Basic Mode>

[Connection Mode of an Optical Communication System]

FIG. 1 is a diagram showing a connection mode of an optical communication system according to a first basic mode of the present invention.

As shown in FIG. 1, the optical communication system of the first basic mode has a connection mode (topology) in which one station side device 10 and multiple home side devices 20 are connected to each other with a plurality of relay devices 30 therebetween serving as intermediaries and by PON lines 1 and 2 at upper and lower levels.

Specifically, the one station side device 10 is connected to the plurality of relay devices 30 under the control thereof by optical fibers in a P2MP manner. Each relay device 30 is connected to a plurality of home side devices 20 under the control thereof by optical fibers in a P2MP manner.

More specifically, a single-core optical fiber 51 connected to the station side device 10 is split into a plurality of single-core optical fibers 53 through an optical coupler 52 which is a passive optical branch node. The relay devices 30 are connected to ends of the split optical fibers 53, respectively.

In addition, a single-core optical fiber 54 connected to the lower-level side of each relay device 30 is split into a plurality of single-core optical fibers 56 through an optical coupler 55 which is a passive optical branch node. Home side devices 20 are connected to ends of the split optical fibers 56, respectively.

Therefore, only one PON line 1 on the upper-level side including an optical fiber network 51 to 53 is present for one OLT 10. PON lines 2 on the lower side each including an optical fiber network 54 to 56 are present for the plurality of relay devices 30 so as to be in the same number as the relay devices 30.

Note that in the following a PON on the upper-level side including the station side device 10, the PON line 1, and the plurality of relay devices 30 may be called a "PON 1", an "upper-level PON", or the like, and a PON on the lower-level side including a relay device 30, a PON line 2, and a plurality of home side devices 20 may be called a "PON 2*j*" (j=1, 2 . . . n: n is the maximum number of the relay devices 30), a "lower-level PON", or the like.

Note also that in the following the "station side device" may be abbreviated as "OLT" and the "home side device" may be abbreviated as "ONU".

Furthermore, in the first basic mode, the PON 1 on the upper-level side between the station side device 10 and the relay devices 30 is 10G-EPON with a transmission rate of 10G (specifically, 10.3125 Gbps), and a PON **2*j* on the lower-level side between a relay device 30 and home side devices 20** is G-EPON with a transmission rate of 1G (specifically, 1.25 Gbps).

[Configuration of the Station Side Device]

Figure 2:
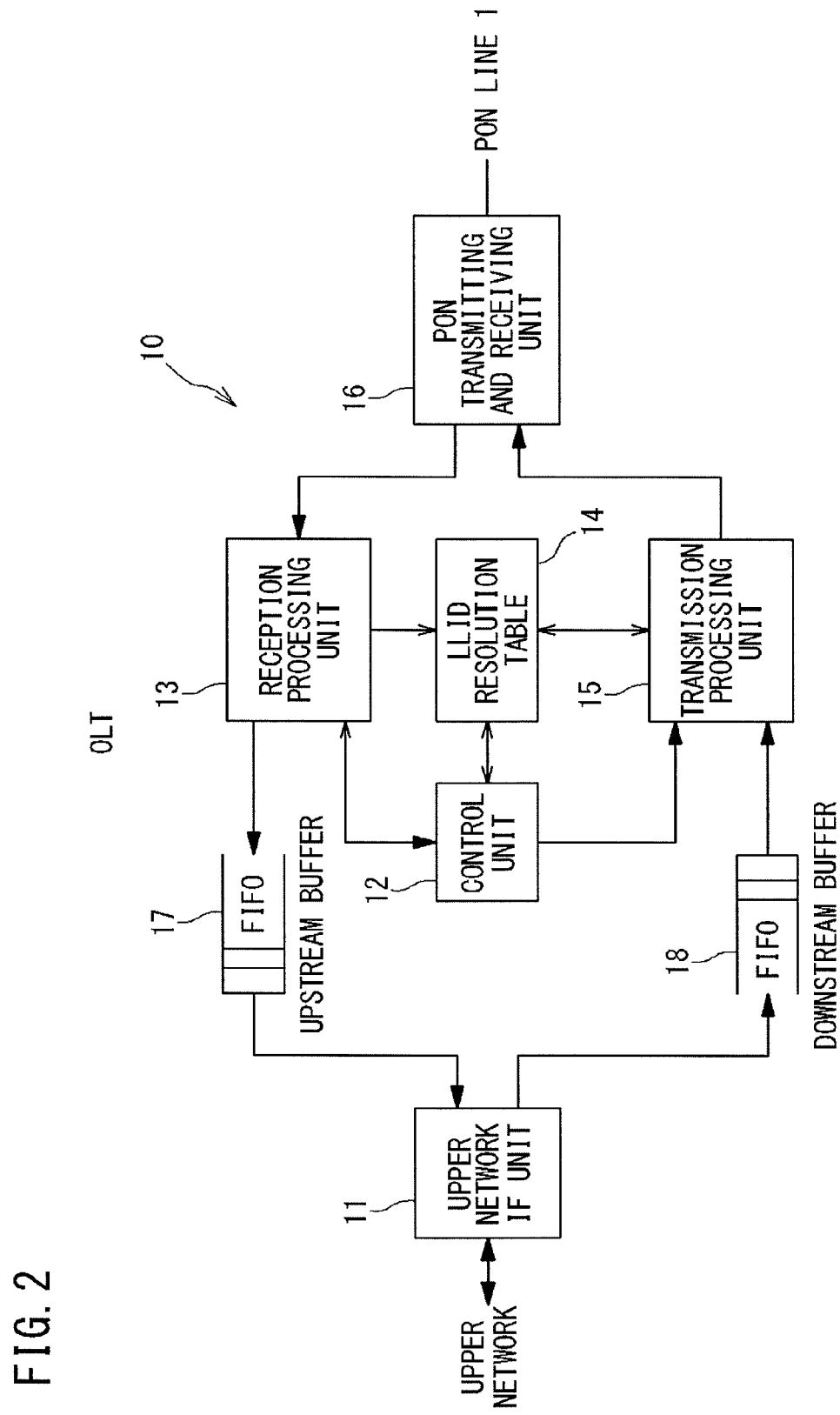
FIG. 2 is a block diagram showing a configuration of a station side device.

FIG. 2 is a block diagram showing a configuration of the station side device 10.

As shown in FIG. 2, the OLT 10 includes an upper network IF (interface) unit 11, a control unit 12, a reception processing unit 13, an LLID (Logical Link ID) resolution table 14, a transmission processing unit 15, and a PON transmitting and receiving unit 16 in order from the upper side (the left side in FIG. 2) to the lower side. In addition, the OLT 10 includes an upstream buffer 17 and a downstream buffer 18.

The PON transmitting and receiving unit 16 converts a 1.27 μm-band optical signal inputted from the PON line 1 into an electrical signal and outputs the electrical signal to the reception processing unit 13, and converts an electrical signal inputted from the transmission processing unit 15 into a 1.577 μm-band optical signal and outputs the optical signal to the PON line 1.

The reception processing unit 13 reconstructs a frame from the electrical signal inputted from the PON transmitting and receiving unit 16. If the frame type is a control frame or an OAM loopback test frame, the reception processing unit 13 outputs it to the control unit 12.

Alternatively, if the frame type is a user frame, the reception processing unit 13 outputs it to the upstream buffer 17, and learns the association between a source MAC address and an LLID and records the association in the LLID resolution table 14. Note that LLIDs in an OAM loopback state are notified from the control unit 12.

If there is a frame in the upstream buffer 17, the upper network IF unit 11 extracts and outputs the frame to an upper network. When a frame is inputted from the upper network, the upper network IF unit 11 outputs the frame to the downstream buffer 18.

The transmission processing unit 15 outputs, as an electrical signal, a frame inputted from the control unit 12, to the PON transmitting and receiving unit 16. If there is a frame in the downstream buffer 18, the transmission processing unit 15 extracts the frame from the downstream buffer 18 during the intervals between frames sent from the control unit 12 and outputs, as an electrical signal, the frame to the PON transmitting and receiving unit 16.

At this time, the transmission processing unit 15 assigns a value determined by referring to the LLID resolution table 14 on the basis of a destination MAC address, as the LLID of a user frame.

The control unit 12 generates control frames such as an MPCP frame and an OAM frame which operate and manage an ONU 20, and transmits the control frames to the ONU 20 through the transmission processing unit 15, and receives, through the reception processing unit 13, a control frame such as an MPCP frame or an OAM frame sent from an ONU 20, and performs a process appropriate to the content of the control frame.

In addition, the control unit 12 notifies the reception processing unit 13 of LLIDs under OAM loopback tests. Note that in the first embodiment, in upstream multiple access control in the PON 1 performed by the control unit 12 of the OLT 10 using MPCP frames, the relay devices 30 function as the ONUs 20.

In the first basic mode, since the upper-level PON 1 is 10G-EPON, optical signals sent and received from/by the OLT 10 are transmitted at 10.3125 Gbps, and the rate of an electrical signal before encoding is 10 Gbps.

[Configuration of the Home Side Devices]

Figure 3:
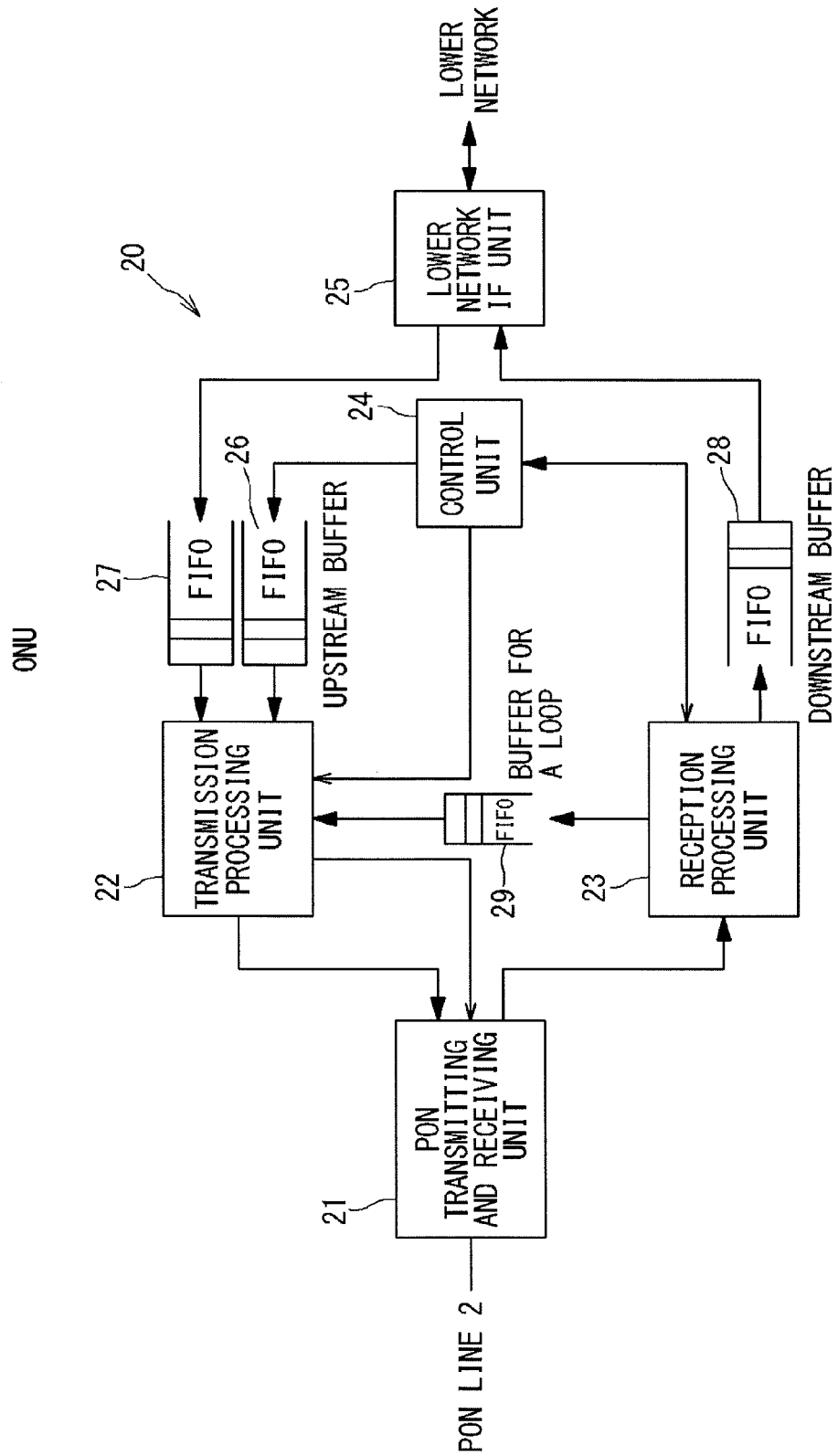
FIG. 3 is a block diagram showing a configuration of a home side device.

FIG. 3 is a block diagram showing a configuration of a home side device 20.

As shown in FIG. 3, the ONU 20 includes a PON transmitting and receiving unit 21, a transmission processing unit 22, a reception processing unit 23, a control unit 24, and a lower network IF (interface) unit 25 in order from the upper side (the left side in FIG. 3) to the lower side.

In addition, the ONU 20 includes two types of upstream buffers 26 and 27, a downstream buffer 28, and a buffer for a loop 29. The first upstream buffer 26 is for control frames, and the second upstream buffer 27 is for user frames.

The PON transmitting and receiving unit 21 converts a 1.49 μm-band optical signal inputted from the PON line 2 into an electrical signal and outputs the electrical signal to the reception processing unit 23, and converts an electrical signal inputted from the transmission processing unit 22 into a 1.3 μm-band optical signal and outputs the optical signal to the PON line 2.

Note that the optical signal outputted from the PON transmitting and receiving unit 21 of the ONU 20 is a burst signal that does not emit light during a period during which a burst enable signal inputted from the transmission processing unit 22 is off.

The reception processing unit 23 reconstructs a frame from the electrical signal inputted from the PON transmitting and receiving unit 21, and discards a frame whose LLID is not destined for the ONU 20 and a frame that does not have a broadcast LLID.

In addition, the reception processing unit 23 checks the frame type of a frame that has not been discarded. If the frame is a control frame, the reception processing unit 23 outputs the frame to the control unit 24. If the frame is a user frame, the reception processing unit 23 outputs the frame to the downstream buffer 28.

Note, however, that when the ONU 20 is in an OAM loopback state, the reception processing unit 23 outputs the user frame to the buffer for a loop 29. Note that LLIDs in an OAM loopback state are notified from the control unit 24.

If there is a frame in the downstream buffer 28, the lower network IF unit 25 extracts and converts the frame into a signal appropriate to a medium in a lower network, and outputs the signal. In addition, when the lower network IF unit 25 receives a signal from the lower network, the lower network IF unit 25 converts the signal into an internal signal and then reconstructs a frame and outputs the frame to the second upstream buffer 27.

The transmission processing unit 22 sends out, as an electrical signal, a report frame generated thereby or frames extracted from the first upstream buffer 26, the second upstream buffer 27, and the buffer for a loop 29 to the PON transmitting and receiving unit 21 during an instructed period, according to a transmission instruction from the control unit 24. At this time, the transmission processing unit 22 enables a burst enable signal.

The transmission instruction from the control unit 24 includes a frame target (whether the frame is a report frame), the transmission start time, and the transmission period.

If the instructed target is a report frame, the transmission processing unit 22 transmits a report frame. If the instructed target is not a report frame, the transmission processing unit 22 transmits a frame in the first upstream buffer 26, the second upstream buffer 26, or the buffer for a loop 29.

Extraction of a frame from each of the buffers 26, 27, and 29 is performed such that an already reported one is given priority, and priority is given in order of the first upstream buffer 26, the second upstream buffer 27, and the buffer for a loop 29.

When the transmission processing unit 22 is instructed by the control unit 24 to generate a report frame, the transmission processing unit 22 generates a report frame by referring to the amount of information saved in the buffers 26, 27, and 29. At this time, the transmission processing unit 22 does not include in a report a series of frames corresponding to a grant length given as an argument.

In addition, upon converting a frame into an electrical signal, the transmission processing unit 22 assigns a broadcast LLID to a registration request frame, and assigns the LLID of the ONU 20 to other frames.

The control unit 24 receives through the reception processing unit 23 an MPCP frame and an OAM frame sent from the OLT 10 and performs processes appropriate to those control frames, and transmits responses thereto or an MPCP frame and an OAM frame generated thereby to the OLT 10 through the transmission processing unit 22.

In addition, when the OAM loopback state has been changed, the control unit 24 notifies the reception processing unit 23 of the change in the state.

In the first basic mode, since the PON 2j on the lower-level side is G-EPON, optical signals sent and received from/by the ONU 20 are transmitted at 1.25 Gbps, and the rate of an electrical signal before encoding is 1 Gbps.

[Configuration of the Relay Devices]

Figure 4:
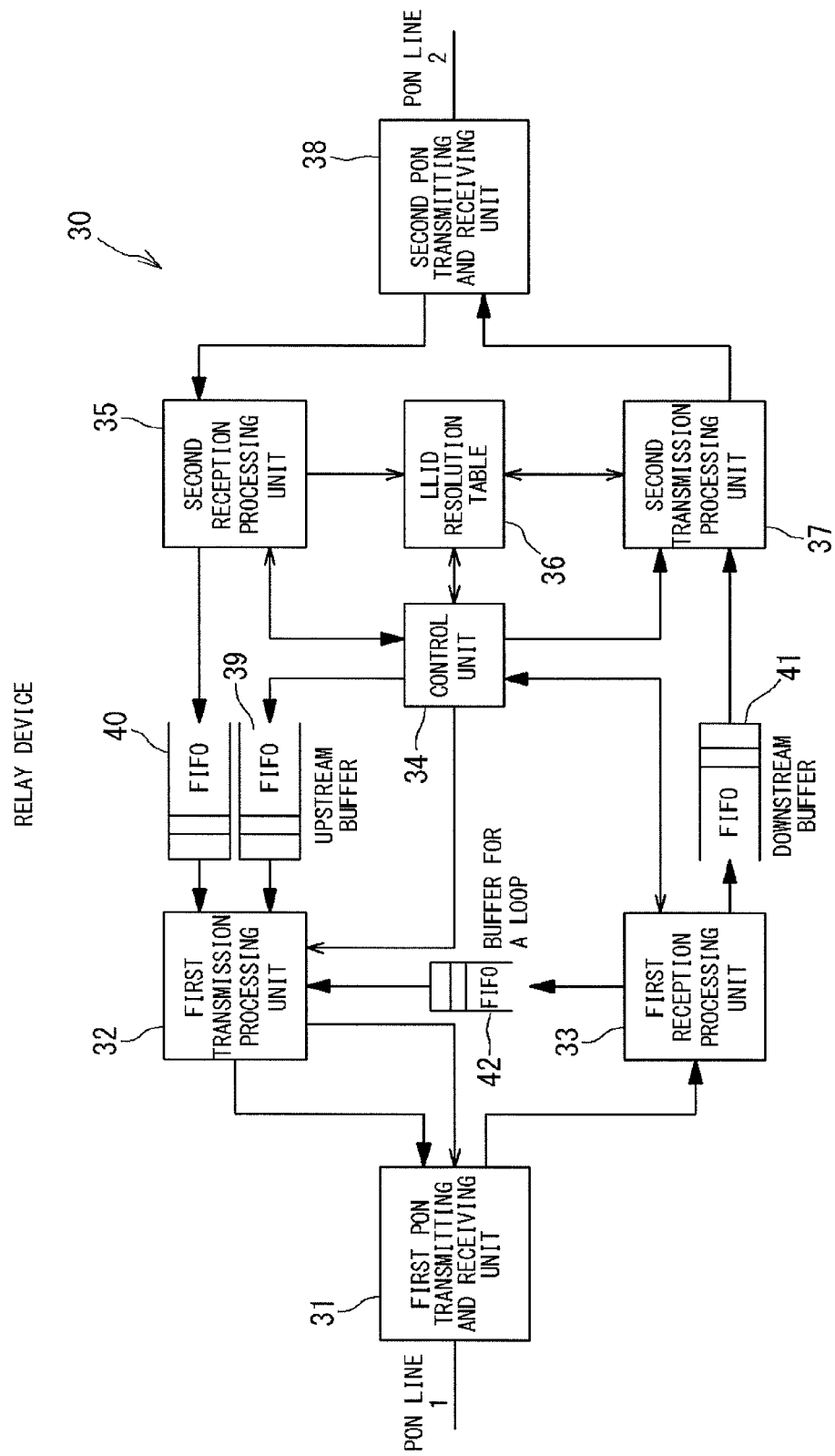
FIG. 4 is a block diagram showing a configuration of a relay device.

FIG. 4 is a block diagram showing a configuration of a relay device 30.

As shown in FIG. 4, the relay device 30 includes a first PON transmitting and receiving unit 31, a first transmission processing unit 32, a first reception processing unit 33, a control unit 34, a second reception processing unit 35, an LLID resolution table 36, a second transmission processing unit 37, and a second PON transmitting and receiving unit 38 in order from the upper side (the left side in FIG. 4) to the lower side.

In addition, the relay device 30 includes two types of upstream buffers 39 and 40, a downstream buffer 41, and a buffer for a loop 42. The first upstream buffer 39 is for control frames, and the second upstream buffer 40 is for user frames.

The first PON transmitting and receiving unit 31 converts a 1.577 μm-band optical signal inputted from the PON line 1 into an electrical signal and outputs the electrical signal to the first reception processing unit 33, and converts an electrical signal inputted from the first transmission processing unit 32 into a 1.27 μm-band optical signal and outputs the optical signal to the PON line 1.

Note that the optical signal outputted from the first PON transmitting and receiving unit 31 of the relay device 30 is a burst signal that does not emit light during a period during which a burst enable signal inputted from the first transmission processing unit 32 is off.

The first reception processing unit 33 reconstructs a frame from the electrical signal inputted from the first PON transmitting and receiving unit 31, and discards a frame whose LLID is not destined for the relay device 30 and a frame that does not have a broadcast LLID.

In addition, the first reception processing unit 33 checks the frame type of a frame that has not been discarded. If the frame is a control frame, the first reception processing unit 33 outputs the frame to the control unit 34. If the frame is a user frame, the first reception processing unit 33 outputs the frame to the downstream buffer 41.

Note, however, that when the relay device 30 is set to an OAM loopback state from the PON line 1, the first reception processing unit 33 outputs the user frame to the buffer for a loop 42. Note that the enable/disable of an OAM loopback state is notified from the control unit 34.

The first transmission processing unit 32 sends out, as an electrical signal, a report frame generated thereby or frames extracted from the first upstream buffer 39, the second upstream buffer 40, and the buffer for a loop 42 to the first PON transmitting and receiving unit 31 during an instructed period, according to a transmission instruction from the control unit 34. At this time, the first transmission processing unit 32 enables a burst enable signal.

The transmission instruction from the control unit 34 includes a frame target (whether the frame is a report frame), the transmission start time, and the transmission period.

If the instructed target is a report frame, the first transmission processing unit 32 transmits a report frame. If the instructed target is not a report frame, the first transmission processing unit 32 transmits a frame in the first upstream buffer 39, the second upstream buffer 40, or the buffer for a loop 42.

Extraction of a frame from each of the buffers 39, 40, and 42 is performed such that an already reported one is given priority, and priority is given in order of the first upstream buffer 39, the second upstream buffer 40, and the buffer for a loop 42.

When the first transmission processing unit 32 is instructed by the control unit 34 to generate a report frame, the first transmission processing unit 32 generates a report frame by referring to the amount of information saved in the buffers 39, 40, and 42. At this time, the first transmission processing unit 32 does not include in a report a series of frames corresponding to a grant length given as an argument.

In addition, upon converting a frame into an electrical signal, the first transmission processing unit 32 assigns a broadcast LLID to a registration request frame, and assigns the LLID of a corresponding ONU 20 to other frames.

The control unit 34 receives through the first reception processing unit 33 an MPCP frame and an OAM frame sent from the OLT 10 and performs processes appropriate to those control frames, and transmits responses thereto or an MPCP frame and an OAM frame generated thereby to the OLT 10 through the first transmission processing unit 32.

Namely, the control unit 34 follows upstream multiple access control performed by the OLT 10, for the transmission timing of upstream frames transmitted from the first PON transmitting and receiving unit 31.

In addition, when the OAM loopback state has been changed, the control unit 34 notifies the first reception processing unit 33 of the change in the state.

In the first basic mode, since the PON 1 on the upper-level side is 10G-EPON, optical signals sent and received to/from the PON line 1 by the relay device 30 are transmitted at 10.3125 Gbps, and the rate of an electrical signal before encoding is 10 Gbps. In addition, since the PON 2j on the lower-level side is G-EPON, optical signals sent and received to/from the PON line 2 by the relay device 30 are transmitted at 1.25 Gbps, and the rate of an electrical signal before encoding is 1 Gbps.

The second PON transmitting and receiving unit 38 converts a 1.31 μm-band optical signal inputted from the PON line 2 into an electrical signal and outputs the electrical signal to the second reception processing unit 35, and converts an electrical signal inputted from the second transmission processing unit 37 into a 1.49 μm-band optical signal and outputs the optical signal to the PON line 2.

The second reception processing unit 35 reconstructs a frame from the electrical signal inputted from the second PON transmitting and receiving unit 38. If the frame type is a control frame or an OAM loopback frame, the second reception processing unit 35 outputs it to the control unit 34.

Alternatively, if the frame type is a user frame, the second reception processing unit 35 outputs it to the second upstream buffer 40, and learns the association between a source MAC address and an LLID and records the association in the LLID resolution table 36. Note that LLIDs in an OAM loopback state are notified from the control unit 34.

The second transmission processing unit 37 outputs, as an electrical signal, a frame inputted from the control unit 34, to the second PON transmitting and receiving unit 38 and extracts, if there is a frame in the downstream buffer 41, the frame from the downstream buffer 41 during the intervals between frames sent from the control unit 34 and outputs, as an electrical signal, the frame to the second PON transmitting and receiving unit 38.

At this time, the second transmission processing unit 37 assigns a value determined by referring to the LLID resolution table 36 on the basis of a destination MAC address, as the LLID of a user frame.

As such, in the first basic mode, the relay device 30 individually grasps the correspondence relationship between the LLIDs of user frames sent out from ONUs 20 and their source MAC addresses (the MAC addresses of the ONUs 20) by the LLID resolution table 36, and manages the LLIDs of the ONUs 20 under the control thereof based on the resolution table 36. Therefore, there is a one-to-many correspondence between a logical link used by the PON line 1 and logical links used by the PON line 2j.

The control unit 34 generates control frames such as an MPCP frame and an OAM frame which operate and manage an ONU 20, and transmits the control frames to the ONU 20 through the second transmission processing unit 37, and receives, through the second reception processing unit 35, a control frame such as an MPCP frame or an OAM frame sent from an ONU 20, and performs a process appropriate to the content of the control frame.

Namely, the control unit 34 performs upstream multiple access control for the reception timing of an upstream frame received by the second PON transmitting and receiving unit 38, independently and separately from the OLT 10.

In addition, the control unit 34 notifies the second reception processing unit 35 of LLIDs in an OAM loopback test state in the PON line 2.

In addition, although the control unit 34 can individually establish MPCP links with the PON 1 and the PON 2j, the control unit 34 performs a registration sequence and a removal sequence of MPCP links in the upper-level PON and the lower-level PON such that the upper-level PON and the lower-level PON are associated with each other. Details of the sequences will be described in subsequent FIGS. 5 and 6.

In the relay device 30 of FIG. 4, the "first reception processing unit 33", the "downstream buffer 41", and the "second transmission processing unit 37" provided between the first PON transmitting and receiving unit 31 and the second PON transmitting and receiving unit 38 compose a downstream "relay processing unit" that relays downstream frames received by the first PON transmitting and receiving unit 31 to the second PON transmitting and receiving unit 38.

The "second reception processing unit 35", the "upstream buffer 40", and the "first transmission processing unit 32" provided between the second PON transmitting and receiving unit 38 and the first PON transmitting and receiving unit 31 compose an upstream "relay processing unit" that relays upstream frames received by the second PON transmitting and receiving unit 38 to the first PON transmitting and receiving unit 31.

As described previously, in the first basic mode, the upper-level PON 1 is 10G-EPON and the lower-level PON 2j is G-EPON and thus their transmission rates differ between the upper-level side and lower-level side of the relay device 30.

Hence, in the relay device 30 of the first basic mode, the difference in transmission rate between the higher-speed PON 1 and the lower-speed PON 2j is absorbed by the second upstream buffer 40 and the downstream buffer 41 which compose the above-described relay processing units.

[Registration Sequence]

Figure 5:
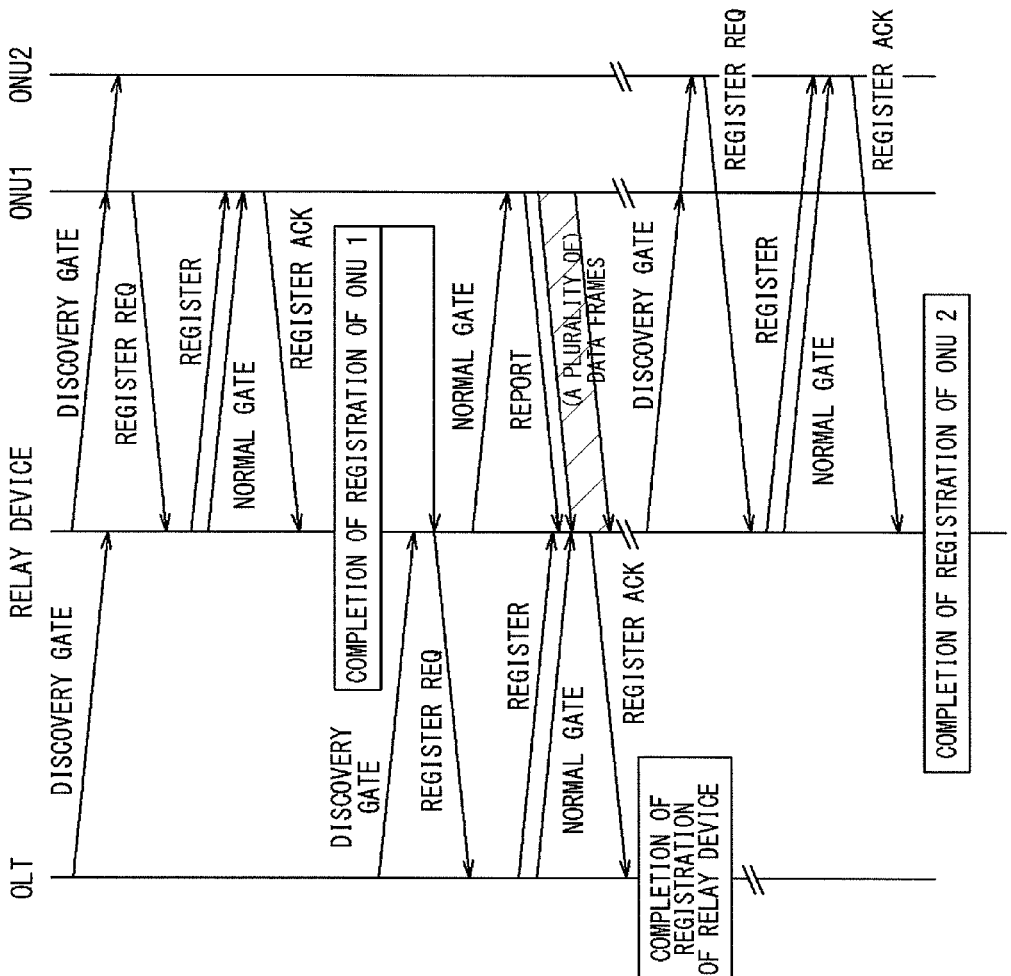
FIG. 5 is a diagram showing a registration sequence with the station side device.

FIG. 5 is a diagram showing a registration sequence of ONUS 20 and a relay device 30 with the OLT 10 in the optical communication system of the first basic mode.

More specifically, FIG. 5 shows the association between MPCP messages exchanged between the relay device 30 and the OLT 10 to register the relay device 30 with the OLT 10, and MPCP messages exchanged between the ONUs 20 and the relay device 30 to register the ONUs 20 with the relay device 30.

Note that the sequences in the diagrams in and after FIG. 5 show two ONUs 20 and one OLT 10 and one relay device 30.

Hence, in the sequences in the diagrams in and after FIG. 5, the "OLT 10" and the "relay device 30" are represented as "OLT" and "relay device", omitting reference signs in the drawings, and the ONUs 20 are represented as "ONU 1" and "ONU 2" to make a distinction therebetween.

As shown in FIG. 5, the OLT and the relay device periodically issue discovery GATEs to their downstream PONs. Here, it is assumed that a PON 2j under the control of the relay device does not have any ONU in operation.

When the ONU 1 that has newly started its operation receives the discovery GATE from the relay device, the ONU 1 sends back a REGISTER REQ during its transmission allowed period. When the relay device receives the REGISTER REQ from the ONU 1, the relay device sends back a REGISTER and sends a normal GATE to the ONU 1.

The ONU 1 sends back a REGISTER ACK during a period during which transmission is allowed by the normal GATE. When the relay device receives the REGISTER ACK from the ONU 1, the relay device completes the registration of the ONU 1.

When the relay device receives a discovery GATE from the OLT after the point in time when any of the ONUs under the control thereof has been registered, the relay device sends a REGISTER REQ back to the OLT during its transmission allowed period.

When the OLT receives the REGISTER REQ from the relay device, the OLT sends back a REGISTER and sends a normal GATE to the relay device.

The relay device sends back a REGISTER ACK during a period during which transmission is allowed by the normal GATE. When the OLT receives the REGISTER ACK from the relay device, the OLT completes the registration of the relay device.

As shown in the last half part of FIG. 5, when the ONU 2 newly starts its operation after the completion of the registration of the relay device in the above-described manner, the same sequence as that for the case of the ONU 1 is performed on the ONU 2, by which the ONU 2 is registered with the relay device.

Here, the registration sequence of the ONU 2 does not affect an MPCP link between the OLT and the relay device. In addition, user frames communicated by the ONU 1 and the ONU 2 with the OLT pass through the same logical link, between the OLT and the relay device.

When the relay device has completed the registration of the ONUs 1 and 2, the relay device establishes OAM links through logical links with the ONUs 1 and 2, and further performs OAM loopback tests.

Then, if the OAM loopback tests succeed, communication of user frames between the logical links and the upper-level PON is enabled.

In addition, when the OLT has completed the registration of the relay device, the OLT establishes an OAM link through a logical link with the relay device, and further performs an OAM loopback test.

Then, if the OAM loopback test succeeds, communication of user frames between the logical link and the upper network is enabled. Note that in the first basic mode those OAM loopback tests are independent of each other.

[Sequence of Upstream Multiple Access Control]

Figure 6:
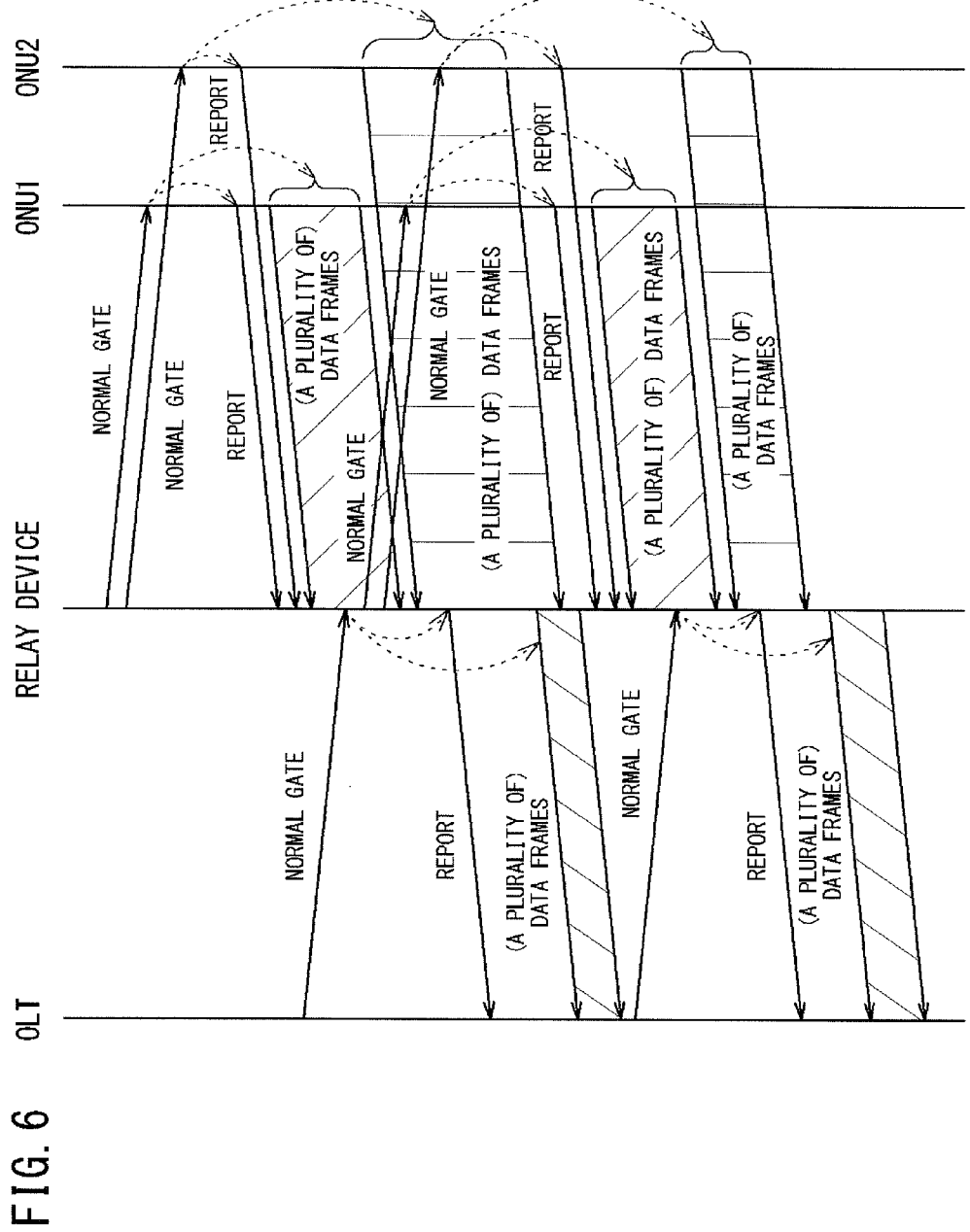
FIG. 6 is a diagram showing a sequence of upstream multiple access control.

FIG. 6 is a sequence diagram showing upstream multiple access control in the PON lines 1 and 2 in the optical communication system of the first basic mode.

More specifically, FIG. 6 shows multiple access control in the upstream direction which is performed after communication of user frames between the relay device and the ONU 1 and the ONU 2 has been enabled, and in which upstream burst signals are time-division multiplexed so as to prevent collisions of the signals in the each of the PON lines 1 and 2.

As shown in FIG. 6, the relay device schedules timing at which reception is performed thereby, such that bursts for reports and bursts for user frames from the ONUs 1 and 2 do not collide with each other, and notifies the ONUs 1 and 2 of the results thereof by normal GATE messages.

Each normal GATE message includes two grants. Of them, the first grant has a Force Report flag being enabled. The grant length of the second grant is determined using report messages received from the ONUs 1 and 2 for reference, or based on the policy of a network operator (telecommunication carrier).

Each of the ONUs 1 and 2 sends out a REPORT message or (a plurality of) data frames during a period indicated by the grant. Here, the data frames include a frame generated by the ONU 1, 2, such as an OAM message, and a user frame received from a lower network.

As shown in the left half part of FIG. 6, the OLT transmits a normal GATE message to the relay device under the control thereof, to independently perform upstream multiple access control for the upper-level PON.

Then, the relay device sends out upstream burst signals to the OLT, according to an instruction of the normal GATE from the OLT.

[Removal Sequence]

Figure 7:
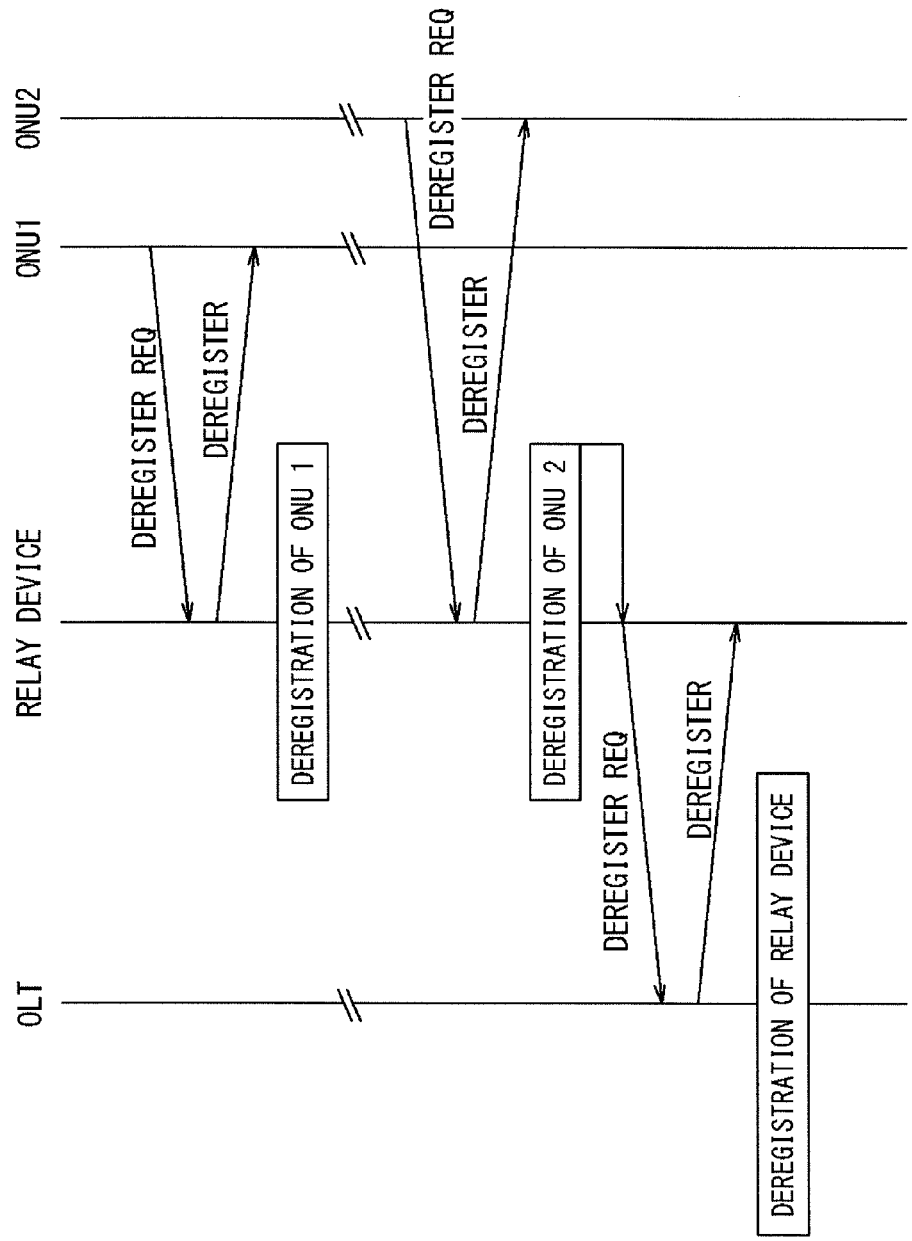
FIG. 7 is a diagram showing a removal sequence from the station side device.

FIG. 7 is a diagram showing a removal sequence of the ONUs 20 and the relay device 30 from the OLT 10 in the optical communication system of the first basic mode.

More specifically, FIG. 7 shows the association between MPCP messages exchanged between the relay device and the OLT to deregister the relay device from the OLT, and MPCP messages exchanged between the ONUs and the relay device to deregister the ONUs from the relay device.

Here, it is assumed that the PON under the control of the relay device does not have any ONU in operation other than the ONU 1 and the ONU 2.

The ONU 1 that newly stops its operation sends a DEREGISTER REQ to the relay device during a transmission allowed period indicated by a GATE message which is not shown in FIG. 7.

When the relay device receives the DEREGISTER REQ from the ONU 1, the relay device sends back a DEREGISTER and deregisters the ONU 1.

When ONU 2 stops its operation thereafter, the same sequence as that for the case of the ONU 1 is performed, by which the relay device deregisters the ONU 2.

Here, since ONUs registered under the relay device are not present any more, the relay device sends a DEREGISTER REQ to the OLT during a transmission allowed period indicated by a GATE message which is not shown in FIG. 7. When the OLT receives the DEREGISTER REQ from the relay device, the OLT sends back a DEREGISTER and deregisters the relay device.

[Effects of the First Basic Mode]

As described above, according to the relay device 30 of the first basic mode, the control unit 34 follows upstream multiple access control performed by the OLT 10, for transmission of upstream frames transmitted from the relay device 30, and independently performs upstream multiple access control for reception of upstream frames received by the relay device 30. Thus, a multi-level connection optical communication system such as that shown in FIG. 1 can be formed that includes an upper-level PON connecting a plurality of relay devices 30 with one OLT 10 at the top; and lower-level PONs each further connecting a plurality of ONUs 20 under the control of a corresponding relay device 30.

Hence, since the transmission distance unique to the PON has a value obtained by adding the transmission distance for the upper-level PON (PON 1) and the transmission distance for the lower-level PON (PON 2j), the distance between the OLT 10 and the ONUs 20 can be increased.

In addition, for the number of splits unique to the PON, since the number of splits for the upper-level PON and the number of splits for the lower-level PONs can be multiplied, the overall number of splits of the optical communication system can be increased.

In addition, even if the number of lower-level PONs is increased, one OLT 10 is sufficient and thus the overall cost of the optical communication system can be suppressed. In this case, since one interface of the OLT 10 with the upper network is sufficient, the overall cost of the optical communication system including the upper network can be suppressed.

Furthermore, since one relay device is sufficient per lower-level PON, in terms of this, too, the overall cost of the optical communication system can be suppressed.

Furthermore, the relay device 30 can sequentially perform, by the common control unit 34, control for performing communication by participating in the upper-level PON and control for performing communication by allowing the ONUs 20 to participate in the lower-level PON. Therefore, for example, one CPU for performing control is sufficient and thus the cost of the relay device 30 can be suppressed.

According to the relay device 30 of the first basic mode, the difference in transmission rate between the upper-level PON and the lower-level PON is absorbed by the upstream buffer 40 and the downstream buffer 41, by which the upper-level PON is made to be 10G-EON and the lower-level PON is made to be 1G-EPON. Therefore, even when the number of splits n of the upper-level PON is increased, bandwidth per user can be secured.

In addition, according to the relay device 30 of the first basic mode, there is a one-to-many correspondence between the logical link in the upper-level PON used for upstream multiple access control performed by the OLT 10 and the logical links in the lower-level PON used for upstream multiple access control performed by the control unit 34. Therefore, the number of logical links in the upper-level PON depends on the number of the relay devices 30 but not on the number of the ONUs 20.

Hence, even if the number of ONUs 20 under the control of the relay device 30 is increased, burst overhead and the overhead of control messages do not change, enabling to prevent an unwanted reduction in bandwidth per user.

Furthermore, according to the relay device 30 of the first basic mode, the control unit 34 requests the OLT 10 to establish a logical link in the upper-level PON after establishing a logical link in the lower-level PON. Thus, when there are no ONUs 20 in operation under control of the relay device 30, the relay device 30 is not registered with the OLT 10.

Hence, wasteful control messages are not generated between the relay device 30 having no ONUs 20 registered therewith and the OLT 10, enabling to prevent an unwanted reduction in user bandwidth in the upper-level PON.

Note that although in the above-described first basic mode each of the OLT 10, the ONUs 20, and the relay devices 30 is provided with one upstream queue (buffer) for user frames and one downstream queue (buffer) for user frames, a plurality of those queues may be provided according to priority levels or QoS classes.

Note also that although in the above-described first basic mode MAC addresses and LLIDs are associated with each other using the LLID resolution tables 14 and 36 of the OLT 10 and the relay device 30, for example, the VLAN tag values (VIDs) and LLIDs of user frames may be associated with each other. In this case, it is suitable to provide registration of table elements by a network administrator or a management apparatus, instead of on a learning basis.

<Second Basic Mode>

[Device Configuration, Etc., of the Second Basic Mode]

The configurations of an optical communication system, an OLT 10, and ONUs 20 according to a second basic mode of the present invention are the same as those in the case of the first basic mode (see FIGS. 1 to 3).

Meanwhile, a relay device 30 used in the second basic mode acts as a plurality of "logical ONUs" with respect to an upper-level PON 1. The logical ONUs are provided so as to have a one-to-one correspondence with ONUs 20 in a lower-level PON 2j (j=1, 2 . . . n).

The basic components of the relay device 30 are the same as those in the case of the first basic mode (FIG. 4). However, in the second basic mode, a second upstream buffer 40 for upstream user frames is provided for each logical ONU in the upper-level PON.

Upon relaying an upstream user frame, the relay device 30 of the second basic mode uniquely determines an LLID to be used in the PON 1 which is a relay destination, from an LLID used in the PON 2j which is a relay source. In addition, in the second basic mode, a buffer for a loop 42 in FIG. 4 is not necessary, the reason for which will be described later in description of FIG. 11.

Figure 8:
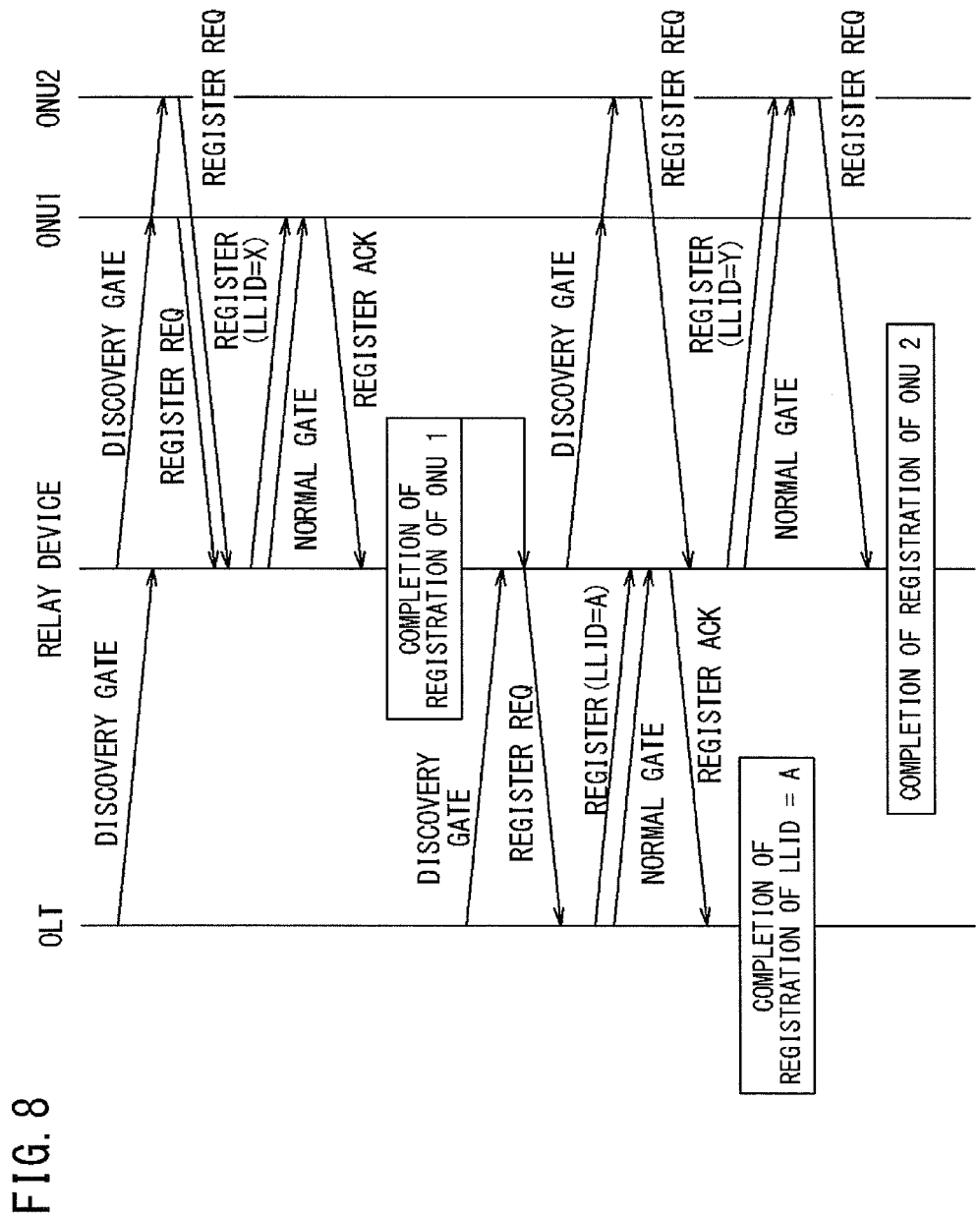
FIG. 8 is a diagram showing a registration sequence with the station side device in the case of a second basic mode.
Figure 9:
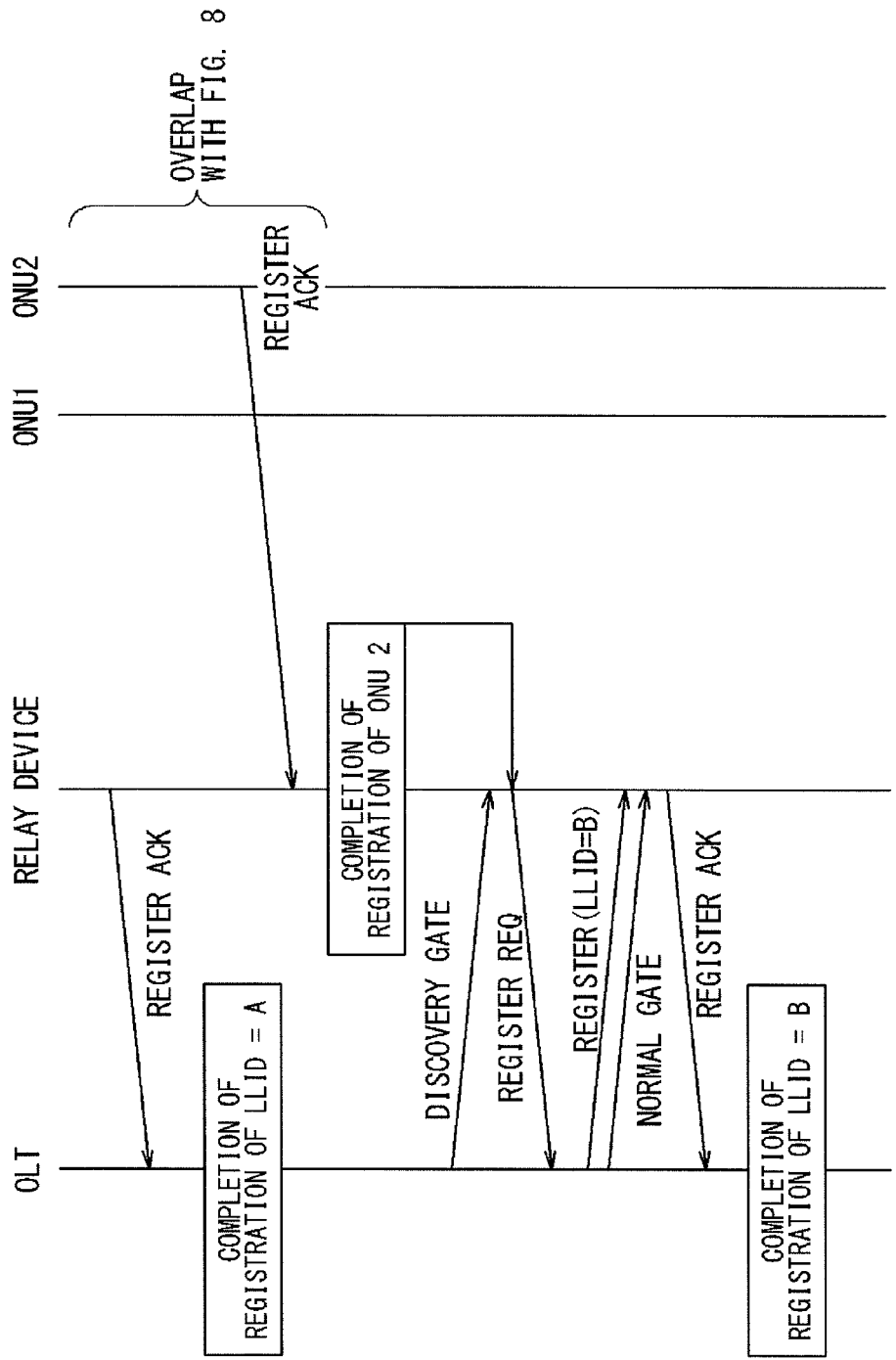
FIG. 9 is a diagram showing a sequence continued from FIG. 8.

[Registration sequence] FIGS. 8 and 9 are diagrams showing a registration sequence of ONUs and logical ONUs in a relay device in the optical communication system of the second basic mode. Note that FIG. 9 is a diagram continued from FIG. 8.

More specifically, FIGS. 8 and 9 show the association between MPCP messages exchanged between the logical ONUs in the relay device and the OLT to register the logical ONUs with the OLT, and MPCP messages exchanged between the ONUs and the relay device to register the ONUs with the relay device.

As shown in FIG. 8, the OLT and the relay device periodically issue discovery GATEs to their downstream PONs.

When an ONU 1 that has newly started its operation receives the discovery GATE from the relay device, the ONU 1 sends back a REGISTER REQ during its transmission allowed period. When the relay device receives the REGISTER REQ from the ONU 1, the relay device sends back a REGISTER (an LLID set here is "X") and sends a normal GATE to the ONU 1.

The ONU 1 sends back a REGISTER ACK during a period during which transmission is allowed by the normal GATE. When the relay device receives the REGISTER ACK from the ONU 1, the relay device completes the registration of the ONU 1.

When the relay device receives a discovery GATE from the OLT after the completion of the registration of the ONU 1, the relay device sends back a REGISTER REQ during its transmission allowed period.

At this time, the source MAC address of the REGISTER REQ is changed on a per ONU in the lower-level PON basis, so as to allow the OLT to recognize it as a new "logical ONU".

Specifically, when the OLT receives the REGISTER REQ from the relay device, the OLT sends back a REGISTER (LLID=A) and sends a normal GATE to the relay device. The relay device sends back a REGISTER ACK during a period during which transmission is allowed by the normal GATE.

The relay device stores the association between the LLID (=X) between the relay device and the ONU 1 in the lower-level PON and the LLID (=A) in the upper-level PON, in the aforementioned LLID resolution table 36 (see FIG. 4).

Note that in the case of the second basic mode since, as described above, logical links of the upper and lower levels are allowed to have a one-to-one correspondence upon discovery, there is no need for a second reception processing unit 35 of the relay device (see FIG. 4) to learn the association between the source MAC address and LLID of a received user frame, and record the association in the resolution table 36, like the case of the first basic mode.

In addition, a second transmission processing unit 37 of the relay device determines an LLID of a user frame by referring to the resolution table 36 on the basis of the LLID used in the PON line 1.

When the OLT receives the REGISTER ACK from the relay device, the OLT completes the registration of the logical ONU (LLID=A) for the ONU 1.

When an ONU 2 newly starts its operation thereafter, the same sequence as that for the case of the ONU 1 is performed, by which the ONU 2 with LLID=Y is registered with the relay device.

Furthermore, as shown in FIG. 9, in the upper-level PON 1, too, the same sequence as that for the case of the ONU 1 is performed, by which a new logical ONU (LLID=B) for the ONU 2 is registered with the OLT. At this time, the relay device stores a one-to-one correspondence relationship between the LLIDs in the upper-level PON 1 and the lower-level PON 2j in the resolution table 36.

When the relay device has completed the registration of the ONUs 1 and 2 under the control thereof, the relay device establishes OAM links through logical links with the ONUs 1 and 2.

Note, however, that in the second basic mode the relay device does not perform OAM loopback tests on the ONUs 1 and 2 because the OLT performs the tests. In addition, when the OLT has completed the registration of the logical ONUs in the relay device, the OLT establishes OAM links through logical links with the logical ONUs in the relay device. An OAM loopback test performed by the OLT in the second basic mode will be described in FIG. 11.

[Removal Sequence]

Figure 10:
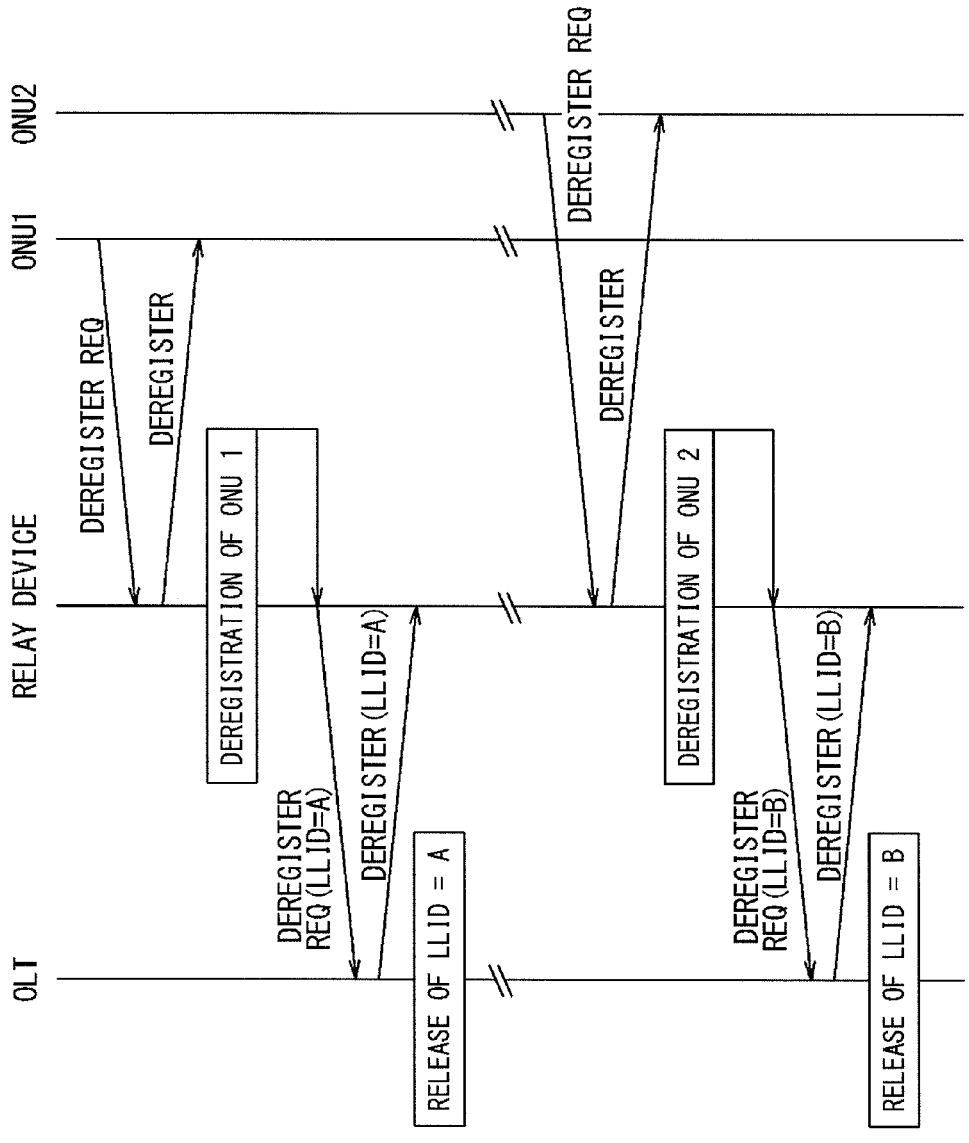
FIG. 10 is a diagram showing a removal sequence from the station side device in the case of the second basic mode.

FIG. 10 is a diagram showing a removal sequence of the ONUs and the logical ONUs in the relay device in the optical communication system of the second basic mode.

More specifically, FIG. 10 shows the association between MPCP messages exchanged between the logical ONUs in the relay device and the OLT to deregister the logical ONUs from the OLT, and MPCP messages exchanged between the ONUs and the relay device to deregister the ONUs from the relay device.

As shown in FIG. 10, the ONU 1 that newly stops its operation sends a DEREGISTER REQ to the relay device during a transmission allowed period indicated by a GATE message which is not shown in FIG. 10.

When the relay device receives the DEREGISTER REQ from the ONU 1, the relay device sends back a DEREGISTER and deregisters the ONU 1.

Then, the relay device sends a DEREGISTER REQ to the OLT through a logical link with LLID=A during a transmission allowed period indicated by a GATE message which is not shown in FIG. 10.

When the OLT receives the DEREGISTER REQ from the logical link with LLID=A, the OLT sends back a corresponding DEREGISTER and deregisters the logical ONU with LLID=A.

When the ONU 2 stops its operation thereafter, too, the same sequence as that for the case of ONU 1 is performed, by which the relay device deregisters the ONU 2.

Furthermore, in the upper-level PON 1, too, the same sequence is performed, by which the OLT deregisters a logical ONU with LLID=B.

[Sequence of a Loopback Test]

Figure 11:
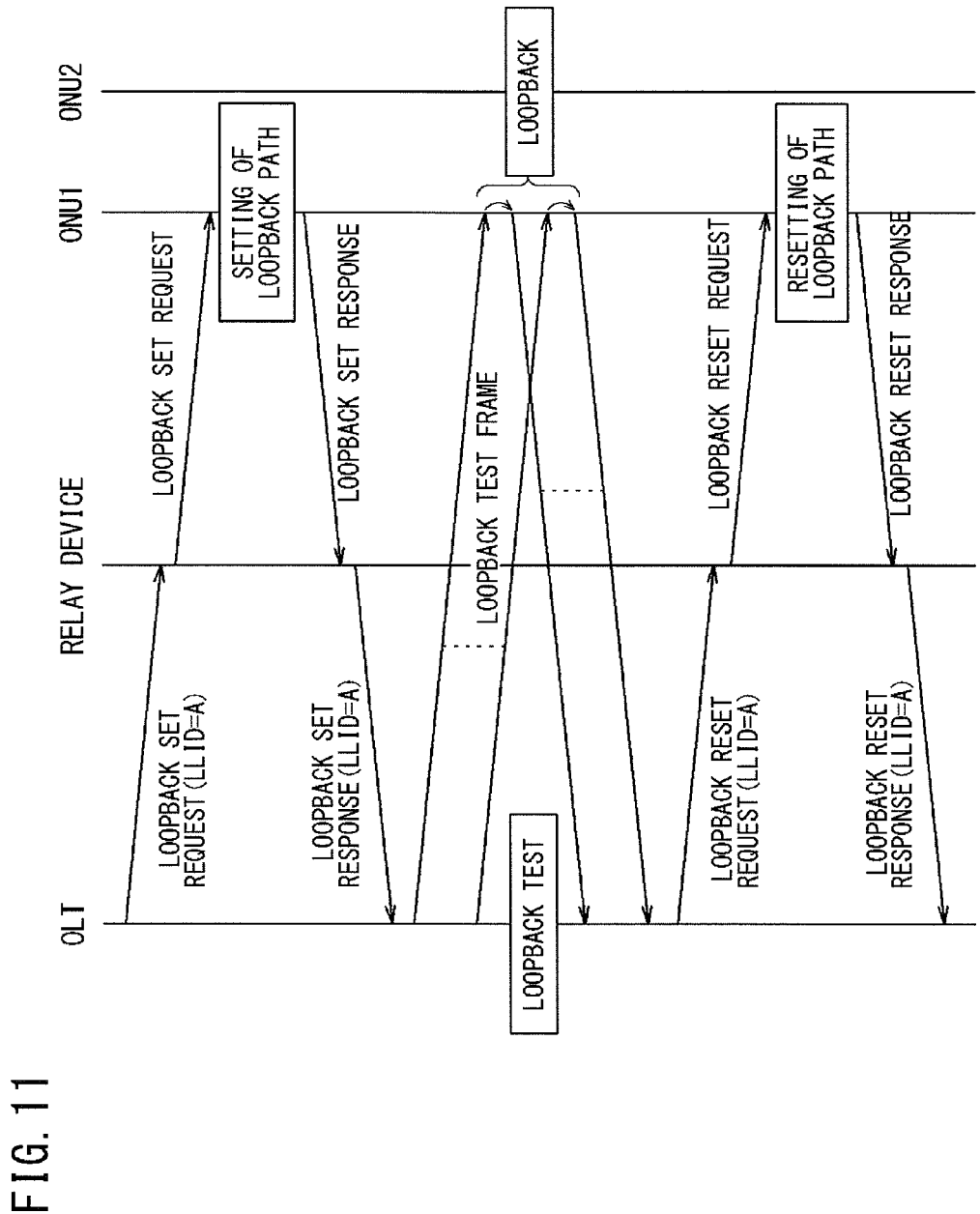
FIG. 11 is a diagram showing a sequence of an OAM loopback test in the case of the second basic mode.

FIG. 11 is a diagram showing an OAM loopback test sequence in the optical communication system of the second basic mode.

More specifically, FIG. 11 shows the association between an OAM loopback test in the upper-level PON and an OAM loopback test in the lower-level PON.

It is assumed that at the start of a sequence in FIG. 11 a logical link with LLID=A and an OAM link thereabove are being established by the OLT.

In this case, the OLT sends a loopback control OAM message requesting to set OAM loopback (hereinafter, referred to as a "loopback set request") to the LLID=A.

When the relay device 1 receives the message from the upper-level PON, the relay device sends a loopback set request to the ONU 1 in the lower-level PON.

When the ONU 1 receives the message from the lower-level PON, the ONU 1 sets an "OAM loopback path" which goes through a buffer for a loop 29, and sends a loopback control OAM message notifying of the setting of the OAM loopback path (hereinafter, referred to as a "loopback set response") back to the relay device.

When the relay device receives the message from the lower-level PON, the relay device sends a loopback set response back to the OLT in the upper-level PON, and enables communication of user frames between the logical link with LLID=A in the upper-level PON and a logical link with LLID=X in the lower-level PON.

When the OLT receives the message, the OLT performs an OAM loopback test on the logical link with LLID=A.

Specifically, a control unit 12 of the OLT notifies a reception processing unit 13 of the fact that LLID=A is in an OAM loopback test state, and then sends an OAM loopback test frame (LLID=A) to a transmission processing unit 15. Then, the control unit 12 of the OLT checks the OAM loopback test frame returned via the reception processing unit 13 to determine whether the test passes or fails.

After the completion of the test, the OLT sends a loopback control OAM message requesting to reset the OAM loopback (hereinafter, a "loopback reset request") to the LLID=A. When the relay device receives the message from the upper-level PON, the relay device sends a loopback reset request to the LLID=X in the lower-level PON.

When the ONU 1 receives the message from the PON, the ONU 1 resets the OAM loopback path which goes through the buffer for a loop 29, and sends back a loopback control OAM message notifying of the resetting of the OAM loopback path (hereinafter, a "loopback reset response").

When the relay device receives the message from the lower-level PON, the relay device sends a loopback reset response back to the OLT in the upper-level PON.

When the control unit 12 of the OLT receives the message, the control unit 12 notifies the reception processing unit 13 of the resetting of the OAM loopback test state of the LLID=A, and enables communication of user frames between the LLID=A and an upper network.

[Effects of the Second Basic Mode]

According to the relay device 30 of the second basic mode, the following effects are further provided compared to the case of the first basic mode.

Specifically, in the second basic mode, every time the relay device 30 establishes a logical link of the PON line 2, the relay device 30 requests the OLT 10 to establish a logical link of the PON line 1 (the registration sequence in FIGS. 8 and 9). Every time the relay device 30 disconnects the logical link of the PON line 2, the relay device 30 requests the OLT 10 to disconnect the logical link of the PON line 1 (the removal sequence in FIG. 10).

Hence, the OLT 10 can manage logical links having a one-to-one correspondence with the ONUs 20, enabling to implement fine-grained QoS control on a per ONU 20 basis and better fairness among the ONUs 20, compared to the case of the first basic mode.

In addition, according to the relay device 30 of the second basic mode, as described above, an OAM loopback test where the upper-level PON and the lower-level PON are linked to each other can be performed (the sequence of an OAM loopback test in FIG. 11). Therefore, trouble related to the upstream buffer 40 or the downstream buffer 41 of the relay device 30 can be detected, enabling to further improve the maintainability of the optical communication system. having same cycles as the centralized DBA and havi FIG. 12 is a diagram showing a sequence of centralized DBA in the first and second basic modes.

The centralized DBA (Dynamic Bandwidth Allocation) refers to DBA where fixed bandwidth allocation cycles (the cycle length is "To" and the cycles are C1, C2, . . . ) are set and an OLT performs each of report collection and data collection one time at the most for each cycle To and sends out a gate instructing the transmission timing of the next report and data.

Figure 12:
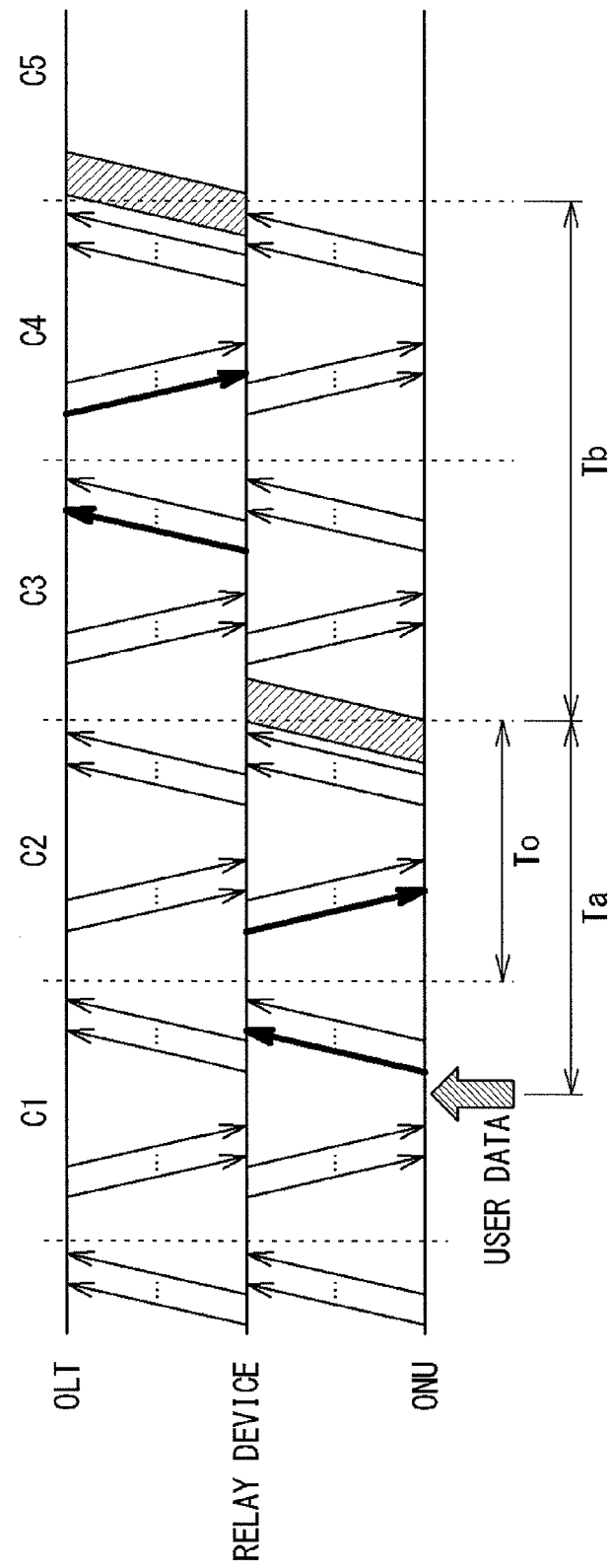
FIG. 12 is a diagram showing a sequence of centralized DBA in the first and second basic modes.

In FIG. 12, a down arrow indicates a "normal GATE message", an up arrow indicates a "REPORT message", and a hatched rhombus indicates transmission of "user data" (also referred to as a user frame or a data frame).

In addition, an arrow represented by a "bold line" indicates that a "GATE message" or a "REPORT message" includes a value corresponding to user data. Therefore, a bold-line GATE message is a grant (transmission allowance) by the OLT or a relay device, and a bold-line REPORT message is a request (bandwidth report) by an ONU or the relay device.

In general, in a PON where an OLT or a relay device dynamically allocates upstream bandwidth based on a bandwidth report from the relay device or an ONU under the control thereof, an "upstream delay time" required for the following processes 1) to 3) occurs from a point in time when upstream user data arrives at the relay device or the ONU and is accumulated in a buffer of the relay device or the ONU to a point in time when the user data arrives at the OLT or the relay device and is accumulated in a buffer of the OLT or the relay device.

1) The ONU or the relay device reflects the user data in a report (bandwidth report)
2) The relay device or the OLT dynamically allocates upstream bandwidth and reflects it in a gate (transmission allowance)
3) The ONU or the relay device transmits the user data to the relay device or the OLT at timing instructed by the gate Therefore, in a multi-level PON where the OLT and the relay device independently perform upstream multiple access control of an upper-level PON and a lower-level PON, when the upstream delay time of the lower-level PON is Ta and the upstream delay time of the upper-level PON is Tb, as shown in FIG. 12, the overall upstream delay time of the system is (Ta+Tb).

Each of the upstream delay time Tb of the upper-level PON occurring by the centralized DBA of the OLT and the upstream delay time Ta of the lower-level PON occurring by the centralized DBA of the relay device is 2 Tos to 3 Tos even in the case of no congestion.

Hence, when the OLT and the relay device independently perform centralized DBA in the above-described first and second basic modes, the upstream delay time before user data having arrived at the ONU arrives at the OLT (Ta+Tb) is 4 Tos to 6 Tos even in the case of no congestion, resulting in a relatively long upstream delay time.

In view of this, in the embodiments of the present invention, the relay device requests in advance the station side device in the upper-level PON for the amount of data to be granted to the ONU in the lower-level PON, before the user frame arrives at the relay device from the ONU (reservation bandwidth report), by which the total upstream delay time (Ta+Tb) in the multi-level PON can be reduced.

The embodiments of the present invention in which the upstream delay time is reduced by the relay device making the above-described reservation bandwidth report will be described below.

Note that, in G-EPON and 10G-EPON, even if the same series of user frames is targeted, the amount of report (queue status) and the amount of grant (grant length) do not become equal to each other, and thus, the relay device performs appropriate conversion when reporting the amount of data to be granted to an ONU in the lower-level PON to the station side device in the upper-level PON.

Specifically, burst overhead time included in the amount of grant to the ONU in the lower-level PON and the time required to transmit a report frame are not reflected in the amount of report to the station side device in the upper-level PON. In addition, an amount corresponding to overhead caused by FEC (Forward Error Correction) parity bits is adjusted. Furthermore, the amount of grant allocated to transmit a control frame other than a report frame is not reflected in the amount of report.

In addition, to facilitate distinction between a user frame and a control frame, the ONU in the lower-level PON may separately report the queue statuses of the user frame and the control frame.

Since FEC in G-EPON employs a frame FEC scheme, the FEC overhead rate somewhat changes depending on the frame length.

Therefore, it is impossible to accurately estimate the amount of FEC overhead from the amount of report targeted for a set of frames. Conversion may be performed assuming an average frame length. However, in terms of a reduction in fragment loss, an amount corresponding to FEC overhead may be underestimated.

<First Embodiment>
[Device Configuration, Etc., of the First Embodiment]

The configurations of an optical communication system, an OLT 10, and ONUs 20 according to the first embodiment are the same as those in the case of the first basic mode (see FIGS. 1 to 3).

The basic components of a relay device 30 are also the same as those of the case of the first basic mode (FIG. 4), but in the first embodiment the correspondence relationship between the logical link of a PON line 1 and the logical links of a PON line 2 is any and thus may be either "one-to-many" or "one-to-one".

[Configuration and Function of an Upstream Buffer]

Figure 13:
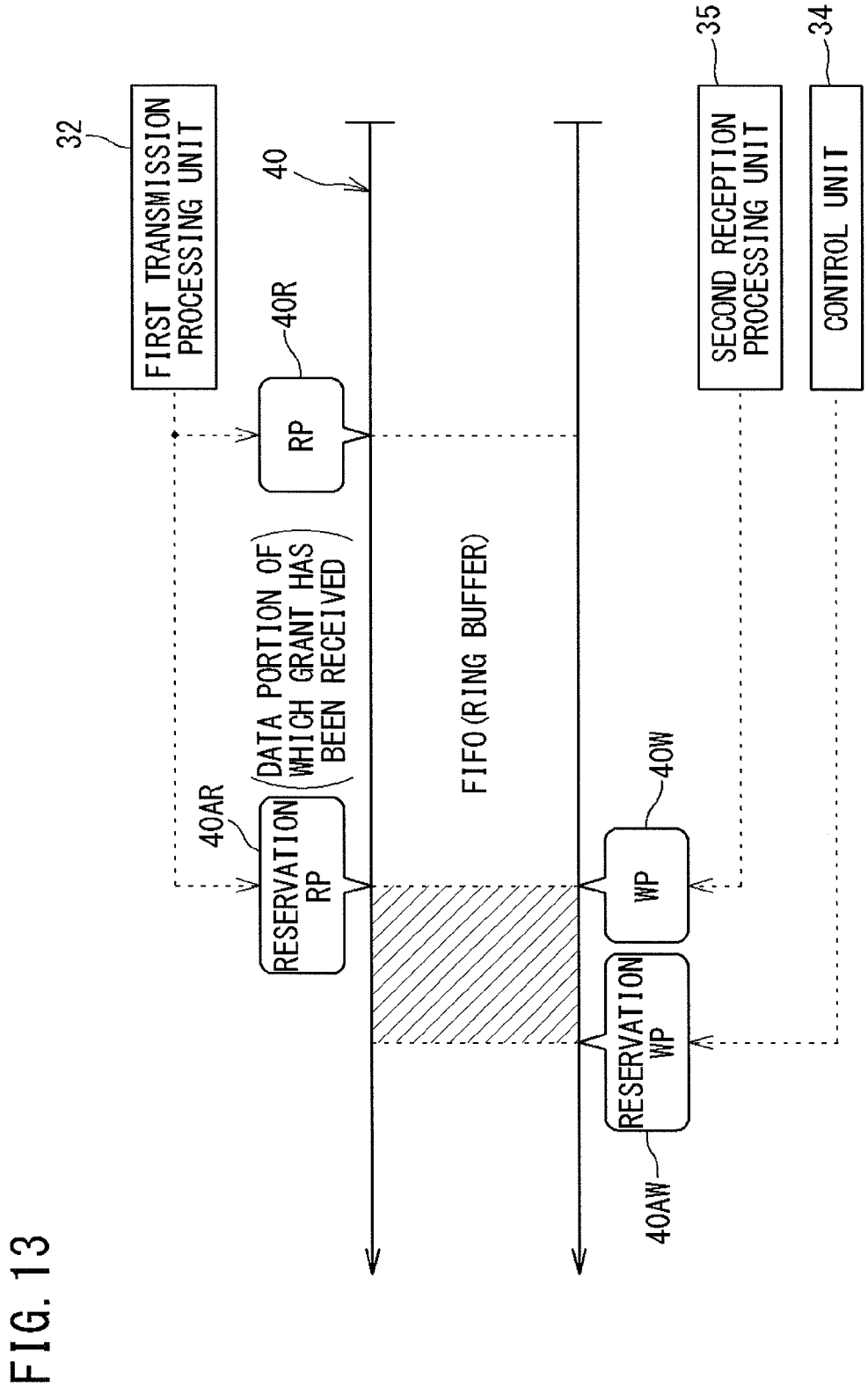
FIG. 13 is an illustrative diagram of a second upstream buffer for user frames which is used in a relay device (the basic configuration is the same as that of FIG. 4) of a first embodiment.

FIG. 13 is an illustrative diagram of a second upstream buffer 40 for user frames which is used in the relay device 30 (the basic configuration is the same as that of FIG. 4) of the first embodiment.

As shown in FIG. 13, in the relay device 30 of the first embodiment, the second upstream buffer 40 is composed of a ring buffer capable of making a "reservation" for both reading and writing, and has a reservation read pointer 40AR and a reservation write pointer 40AW in addition to a read pointer 40R and a write pointer 40W.

The read pointer 40R is a pointer indicating the current data read position in a storage area, and the reservation read pointer 40AR is a pointer for marking in advance a future data read position in the storage area. The read pointer 40R and the reservation read pointer 40AR are managed by a first transmission processing unit 32.

The first transmission processing unit 32 tracks, by the reservation read pointer 40AR, a read position of a data portion of which grant has been received and which is scheduled to be transmitted.

The write pointer 40W is a pointer indicating the current data write position in the storage area, and the reservation write pointer 40AW is a pointer for marking in advance a future data write position in the storage area. The write pointer 40W is managed by a second reception processing unit 35, and the reservation write pointer 40AW is managed by a control unit 34.

When the control unit 34 has found the amount of buffer of user frames to be transmitted in the upstream direction in the next cycle as a result of performing DBA on the ONUs 20 under the control thereof which belong to a lower-level PON, the control unit 34 moves forward the reservation write pointer 40AW to include the amount of buffer.

When the first transmission processing unit 32 transmits a report to an OLT 10 in the PON line 1, the first transmission processing unit 32 refers to the reservation write pointer 40AW of the control unit 34 and uses, as a report target to the OLT 10, a portion enclosed by the reservation read pointer 40AR and the reservation write pointer 40AW.

Note that in G-EPON and 10G-EPON the amount of report and the amount of grant include a (minimum) gap between frames, and thus, (invalid) data corresponding to the minimum gap between frames may be included in the second upstream buffer 40.

Alternatively, the second upstream buffer 40 may be divided into two FIFOs, a virtual FIFO for report processing and a real FIFO that stores actual frame data. For the representations of the virtual FIFO, it is sufficient to have a read pointer, a write pointer, a reservation read pointer, and a reservation write pointer, and the substance of a ring buffer is not necessary.

On the other hand, the real FIFO is a normal FIFO having a read pointer, a write pointer, and a ring buffer as substances, and stores a series of net user frames, excluding a gap between frames and FEC parity bits.

In this configuration of the second upstream buffer 40, when a user frame arrives from the lower-level PON, user frame data is written to the real FIFO and the write pointer of the virtual FIFO is moved forward, including a gap between frames.

In addition, when the user frame is transmitted to an upper-level PON, the frame data is read from the real FIFO and the read pointer of the virtual FIFO is moved forward, including the gap between frames.

In addition, when a grant process to the lower-level PON is performed, the reservation write pointer of the virtual FIFO is moved forward, excluding the amount corresponding to FEC parity bits. When a grant is received from the upper-level PON, the reservation read pointer of the virtual FIFO is moved forward by an amount of grant corresponding to the user frame further excluding an amount corresponding to estimated FEC parity bits.

Then, an amount obtained by adding, in some cases, the amount corresponding to the estimated FEC parity bits to the difference between the reservation read pointer and the reservation write pointer of the virtual FIFO is reflected in a report to the upper-level PON. Note that although FEC is essential for 10G-EPON, an amount corresponding to FEC parity bits is not included in the report.

Note also that, in G-EPON, FEC is optional and when FEC is used, an amount corresponding to FEC parity bits is included in the report.

As described previously, since errors may occur in estimated FEC parity bits, after burst reception of a series of user frames from the lower-level PON is completed, the reservation write pointer of the virtual FIFO may be calibrated so as to be equal to the write pointer of the virtual FIFO.

Likewise, after burst transmission of a series of user frames to the upper-level PON is completed, the reservation read pointer of the virtual FIFO may be calibrated so as to be equal to the read pointer of the virtual FIFO.

For that matter, the absolute values of the pointers and the like for the virtual FIFO mean little, and the difference between the reservation write pointer and the reservation read pointer should only be properly traced. In order to prevent errors from being accumulated due to some kind of reason, the series of pointers may be reset on a predetermined condition.

An example of the predetermined condition includes that the amount of report for user frames from the lower-level PON is zero over several cycles and user frames received therebefore have already been transferred to the upper-level PON. If such pointer reset is premised, the write pointer and read pointer of the virtual FIFO may not be required.

[Sequence of Centralized DBA and Effect Thereof]

Figure 14:
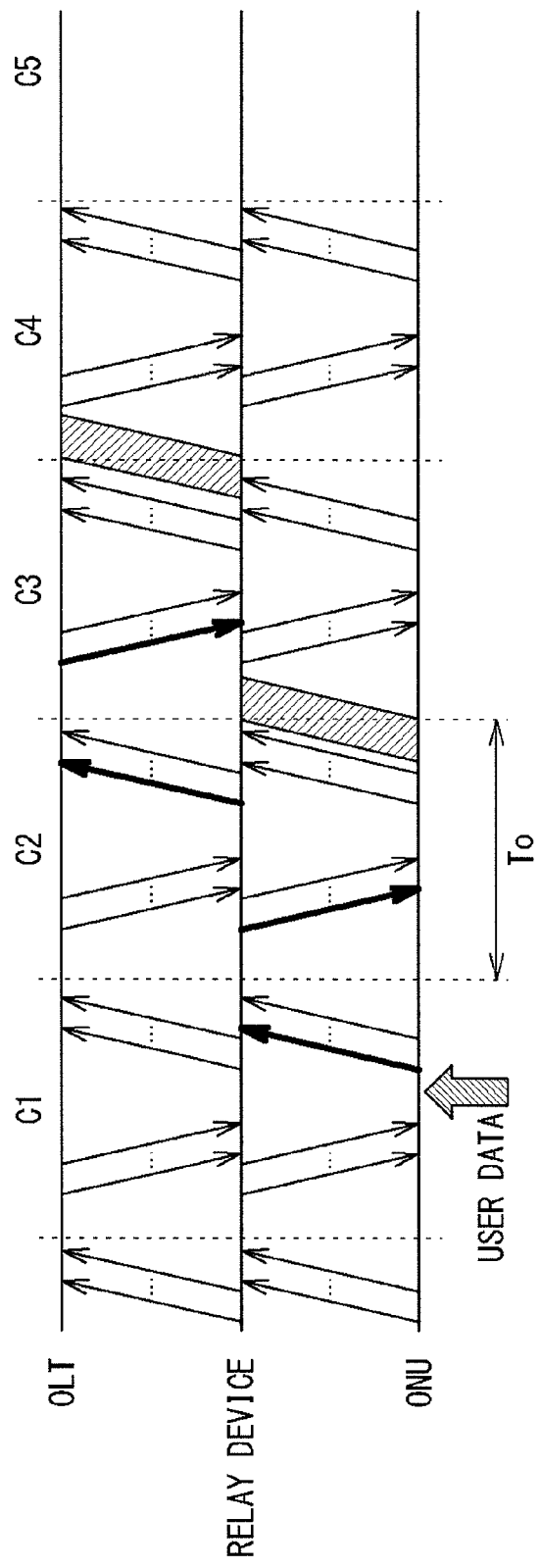
FIG. 14 is a diagram showing a sequence of centralized DBA of the first embodiment.

FIG. 14 is a diagram showing a sequence of centralized DBA of the first embodiment.

In the sequence of the first embodiment shown in FIG. 14, as with the case of FIG. 12, it is assumed that the OLT and the relay device independently perform centralized DBA, and the DBA cycles of the upper-level PON and the DBA cycles of the lower-level PON are the same and have phases matching each other.

To thus allow the phases of the upper-level PON and the lower-level PON match each other, the relay device uses a time that is turned back RTT/2 from the MPCP time of the ONU in the PON line 1 (note that the MPCP time of the ONU is delayed by RTT/2 from the MPCP time of the OLT), as the MPCP time thereof for when the relay device behaves as an OLT in the PON line 2.

Here, the "MPCP time" refers to a local time at each station that performs processes following MPCP. In addition, the "RTT" (Round Trip Time) refers to "back-and-forth propagation time" between the OLT and the relay device in the PON line 1. The OLT may notify the relay device of a value corresponding to RTT using, for example, OAM protocols.

As shown in FIG. 14, when the relay device receives a REPORT message (request) indicating that there is user data, from the ONU in the lower-level PON during a cycle C1, for example, the relay device determines a grant (transmission start time and transmission time) to the ONU, taking also into account reports from other ONUS, and instructs the ONU about the result by a GATE message in the next cycle C2.

The GATE message includes a grant instructing to transmit a report and a grant instructing to transmit the user data (note that, when the user data is not allowed to be transmitted, the latter grant is omitted).

At this time, the relay device (specifically, the control unit 34 of the relay device) determines bandwidth allocated to the user data, and then, makes a write reservation in the second upstream buffer 40 for the amount of buffer corresponding to the allocated bandwidth.

Specifically, the control unit 34 of the relay device moves the reservation write pointer 40AW of the second upstream buffer 40 (see FIG. 13) forward by the amount of buffer corresponding to the determined allocated bandwidth. The first transmission processing unit 32 of the relay device makes a bandwidth request in advance to the OLT by including, in a report, the amount of data corresponding to a portion enclosed by the reservation read pointer 40AR and the reservation write pointer 40AW.

Therefore, as shown in FIG. 14, when the ONU transmits a report describing the amount corresponding to the user data to the relay device in the cycle C1, in the cycle C2 the relay device transmits to the ONU a GATE message in which bandwidth is allocated to the amount corresponding to the user data, and then transmits to the OLT a report in which the amount corresponding to the user data is reflected, before actually receiving the user data from the ONU.

As a result, the user data arrives at the OLT in the upper-level PON at the beginning of a cycle C4. Thus, comparing to the case of FIG. 12 in which user data arrives at the beginning of a cycle C5, the overall upstream delay time of the system is reduced by one cycle.

Note that in the present embodiment, when the logical link of the PON line 1 and the logical links of the PON line 2 have a one-to-many correspondence, the relay device makes a reservation in the second upstream buffer 40 for the amount of buffer corresponding to bandwidth allocated not only to a specific ONU but also to all ONUs under the control thereof in the same cycle, and reflects the amount of buffer in a report to the OLT in the same cycle.

In general, in centralized DBA, collection of reports from each ONU are centralized (in FIG. 14, the last portion of each cycle C1, C2, . . . ) and gates to each ONU are transmitted immediately after collecting the reports.

Note, however, that intervals for RTT and amounts corresponding to delays in the processes of the ONUs are required between the transmission times of GATE messages and transmission disclosure times indicated by grants.

Hence, in the relay device, there is predetermined allowance time (hereinafter, the allowance time is referred to as "Tm") during a period from when the relay device determines bandwidth allocated to all ONUs in the PON line 2 where the relay device behaves as an OLT until when the relay device determines a report value to the OLT in the PON line 1 where the relay device behaves as an ONU.

[Variant of the First Embodiment]

Figure 15:
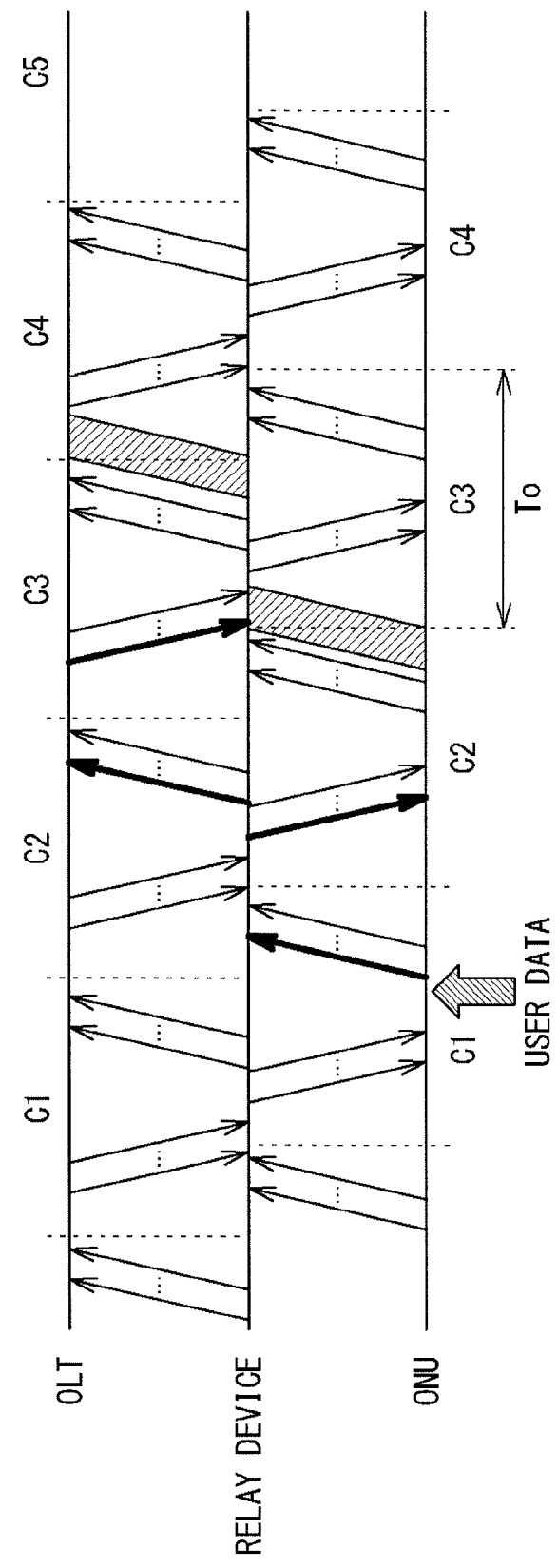
FIG. 15 is a diagram showing a sequence of centralized DBA according to a variant of the first embodiment.

FIG. 15 is a diagram showing a sequence of centralized DBA according to a variant of the first embodiment.

The sequence of FIG. 15 differs from that of FIG. 14 in that the DBA cycles in the PON line 2 of the relay device are delayed by predetermined time (e.g., the above-described Tm) from the DBA cycles in the PON line 1 of the OLT.

By adopting the sequence according to the variant, even when arrival of user data to the ONU in the PON line 2 is delayed by up to the above-described predetermined time (e.g., Tm), the OLT in the PON line 1 receives the user data in the same cycle as that of the case of FIG. 14.

Hence, there is an advantage in that the overall upstream delay time of the system can be further reduced by an amount corresponding to the predetermined allowance time by which the DBA cycles in the lower-level PON are delayed.

Furthermore, when the logical link of the PON line 1 and the logical links of the PON line 2 are allowed to have a one-to-one correspondence, in the relay device, only by determining bandwidth allocated to a specific ONU in the PON line 2, even if bandwidth allocated to other ONUs is not determined, the amount corresponding to the allocated bandwidth can be reflected in a report to the OLT in the PON line 1 which is determined thereafter.

Hence, the Tm can be set to be larger, enabling to further reduce the upstream delay time of the multi-level PON system.

As such, a predetermined effect is provided in terms of that even if the phases of the DBA cycles in the PON line 1 and the PON line 2 do not match each other, upstream delay time is reduced in total.

Therefore, the OLT in the PON line 1 does not necessarily need to notify the relay device of a value corresponding to RTT. The relay device may adopt maximum RTT which is assumed in the PON line 1 or may directly use an MPCP time for when the relay device behaves as an ONU in the PON line 1, as an MPCP time for when the relay device behaves as an OLT in the PON line 2.

<Second Embodiment>

[Device Configuration, Etc., of the Second Embodiment]

The configurations of an optical communication system, an OLT 10, and ONUs 20 according to the second embodiment are the same as those in the case of the first basic mode (see FIGS. 1 to 3).

The basic components of a relay device 30 are also the same as those of the case of the first basic mode (FIG. 4), but the second embodiment assumes the case in which there is a "one-to-one" correspondence relationship between the logical link of a PON line 1 and the logical links of a PON line 2.

In addition, it is assumed that the configuration of a second upstream buffer 40 for user frames which is used in the relay device 30 (the basic configuration is the same as that of FIG. 4) of the second embodiment is the same as that of the first embodiment shown in FIG. 13.

[Sequence of Distributed DBA and Effect Thereof]

Figure 16:
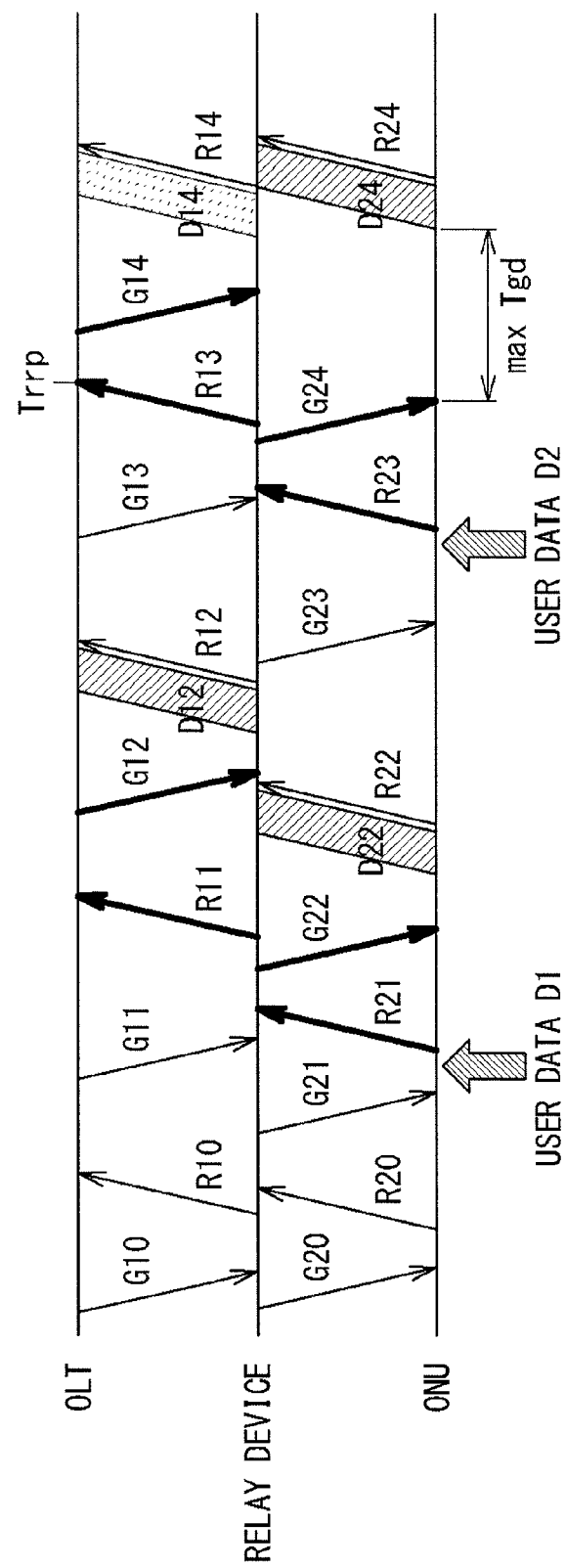
FIG. 16 is a diagram showing a sequence of distributed DBA of a second embodiment.

FIG. 16 is a diagram showing a sequence of distributed DBA of the second embodiment.

As shown in FIG. 16, in the second embodiment, it is assumed that DBA performed by the OLT and the relay device is distributed DBA. The term "distributed DBA" as used herein refers to DBA where a GATE message and a REPORT message are exchanged in arbitrary cycles (the cycles do not need to be fixed) for each ONU (logical link) without setting common DBA cycles between all ONUs (logical links).

As shown in FIG. 16, in a typical example of the distributed DBA, the OLT defines one grant in a GATE message and an ONU transmits a REPORT message at the end of a transmission period instructed by the grant. If there is an allowance in the transmission period, the ONU transmits user data before the REPORT message.

In this case, after the ONU transmits the user data for the received grant, the ONU determines a REPORT message. Thus, there is no need to provide a "reservation read pointer" in an upstream buffer 27 of the ONU (see FIG. 3) and the upstream buffer 40 of the relay device (see FIG. 4).

Referring to FIG. 16, assuming that user data D1 is inputted to an ONU before a REPORT message R21 is transmitted, the ONU reflects the amount corresponding to the user data D1 in the REPORT message R21.

The relay device instructs the ONU for a grant therefor by a GATE message G22. In accordance with the instruction, the ONU transmits the user data D1 during a period indicated by D22 and subsequently transmits a REPORT message R22.

On the other hand, the relay device reflects the amount corresponding to the user data D1 in a REPORT message R11 generated after determining the GATE message G22, and transmits the REPORT message R11 to the OLT in the PON line 1. The REPORT message R11 is a reservation bandwidth report to the OLT by the relay device.

The OLT instructs the relay device for a grant therefor by a GATE message G12. In accordance with the instruction, the relay device transmits the user data D1 having received from the ONU beforehand, during a period indicated by D12 and subsequently transmits a REPORT message R12.

Here, in the case of normal distributed DBA where R11 is not transmitted in advance, the relay device reflects the amount corresponding to the user data D1 in the REPORT message R12 generated after receiving the data frame D22 for the user data D1 from the ONU.

On the other hand, in the distributed DBA of the second embodiment, since the relay device makes a reservation bandwidth report to the OLT by R11, timing at which the GATE message G12 is received from the OLT is earlier correspondingly, enabling to reduce the upstream delay time of the multi-level PON system.

Meanwhile, in typical distributed DBA, adjustment of bandwidth is performed by increasing or reducing DBA cycles.

Hence, as shown in exchanges performed after user data D2 in FIG. 16, the DBA cycle of a specific logical link of the PON line 2 is longer than the DBA cycle of a corresponding logical link of the PON line 1. Thus, before user data D24 granted by the relay device actually arrives at the relay device from the PON line 2, the relay device may be instructed by the OLT for data transmission D14 of the amount corresponding to the user data.

In such a case, since the user data D2 has not been arrived yet at the buffer 40 during a time period (the time period D14 in FIG. 16) instructed by the OLT, the relay device cannot transmit the user data D2 to the OLT, resulting in a waste of the bandwidth of the PON line 1.

To avoid such a problem, it is preferred to set an upper limit (referred to as "maxTgd") to a gate delay of the PON line 2 (the difference between the transmission time of a GATE message and the transmission start time of a grant provided by the GATE message: hereinafter, also referred to as "ONU processing time") and an upper limit to RTT (hereinafter, referred to as "maxRTT2").

In this case, assuming that the relay device makes a write reservation in the upstream buffer 40 after transmitting a GATE message G24 and the OLT receives a REPORT message R13 from the relay device at time Trrp, a grant that gives an instruction by a GATE message G14 is determined such that an upstream data frame D14 of which bandwidth is allocated according to the message R13 is received after a transmittable time which is calculated by the following equation.

Transmittable time=$Trrp$+max$Tgd$+max$RTT2$

Note that the above-described maxTgd (or/and maxRTT2) may be set for each logical link included in the PON line 2.

By the OLT thus granting the relay device such that the data frame D14 corresponding to the user data D2 is received after the above-described transmittable time, a waste of the bandwidth of the PON line 1 can be prevented in advance which is caused by the OLT allowing the relay device, at which the user data D2 has not been arrived, to transmit the user data D2.

In the case of the method in which the OLT grants the relay device such that the OLT receives the data frame D14 corresponding to the user data D2 after the above-described transmittable time, there is an advantage in that a waste of the bandwidth of the PON line 1 can be prevented even without changing an existing PON communication protocol.

[Variant of the Second Embodiment]

In the second embodiment, as another means for preventing a waste of the bandwidth of the PON line 1, the relay device may transmit a REPORT message R13 (reservation bandwidth report) which is transmitted to the OLT in the PON line 1, together with a time at which a queue state described in the REPORT message R13 is achieved (hereinafter, referred to as a "queue completion time").

In this case, the OLT in the PON line 1 allows a GATE message G14 for the REPORT message R13 to satisfy a predetermined condition.

The predetermined condition is that a transmission start time which is granted by the OLT by the GATE message G14 exceeds a queue completion time notified by the relay device by the REPORT message R13.

As such, upon a reservation bandwidth report, the relay device reports a queue completion time together with the reservation bandwidth report, and the OLT gives transmission allowance according to the amount of data reported by the relay device, after the queue completion time reported by the relay device. By this, while a waste of the bandwidth of the PON line 1 is prevented in advance, the overall upstream delay time of the multi-level PON system can be reduced.

Note that although the above-described example exemplifies the case in which a queue completion time is included in the REPORT message R13 itself for a reservation bandwidth report, an upstream frame that stores a queue completion time is not limited thereto.

For example, the relay device may transmit to the OLT another message for time notification substantially consecutively after the REPORT message R13, and include a queue completion time in that another message.

<Generalization of the Communication System>

A communication system of the embodiments (including the above-described first and second embodiments and a third embodiment which will be described later) will be described below in a more generalized manner.

Specifically, the communication system of the embodiments can be generally defined as a communication system in which communication networks (PONs, CDNs which will be described later, etc.) that adopt multiple access control of a "polling scheme" are connected to each other in a multi-level manner through a relay station. The term "polling scheme" as used herein refers to a scheme in which a master station allows a slave station to report the amount of information to be transmitted, and then, allows for transmission.

In this case, the "station side device" of the embodiments corresponds to a "master station" in a first communication network (the "upper-level PON" in the multi-level PON) which is an upper network. In addition, the "home side device" of the embodiments corresponds to a "slave station" in a second communication network (the "lower-level PON" in the multi-level PON) which is a lower network.

Furthermore, the "relay device" of the embodiments corresponds to a "relay station" that functions as a slave station in the first communication network (the "upper-level PON" in the multi-level PON) which is the upper network and functions as a master station in the second communication network (the "lower-level PON" in the multi-level PON) which is the lower network.

When the communication system of the embodiments is defined in the above-described manner, the relay station (relay device) according to the first embodiment is a relay station characterized by reporting the amount of data allowed for transmission in the second communication network, to the master station before the data arrives at the relay station.

According to such a communication system, the relay station reports the amount of data allowed for transmission in the second communication network, to the master station before the data arrives at the relay station. Thus, comparing to the case of not making such a report, transmission allowance can be obtained quickly from the master station. As a result, the overall upstream delay time of the system can be reduced.

In addition, when the communication system of the embodiments is defined in the above-described manner, the relay station (relay device) according to the variant of the second embodiment is a relay station characterized by reporting, in addition to the amount of information to be transmitted to the first communication network, information on a time at which the information is actually completed at the relay station (hereinafter, referred to as an "information completion time"), to the master station in the first communication network. Then, in the variant of the second embodiment, the master station performs multiple access control of the relay station such that a time at which the relay station functioning as a slave station in the first communication network is allowed for transmission comes after the information completion time.

According to such a communication system, the master station can perform multiple access control with no waste before the relay station actually performs information transmission. Thus, while a waste of the bandwidth of the first communication network is prevented in advance, the overall transmission delay time of the communication system can be reduced.

In addition, the communication system according to the embodiments may be a communication system in which two or more relay stations are disposed in a multi-level manner; for example, the communication system may have a configuration in which a first communication network and a second communication network are connected to each other by a relay station A at upper and lower two levels, and the second communication network and a third communication network are connected to each other by another relay station B at upper and lower two levels.

Then, when the variant of the second embodiment is applied to the relay station A of the communication system with three or more levels such as that described above, the operation of the relay station A is as follows.

Specifically, when the relay station A receives a report of the amount of information including an information completion time, from the relay station B or a slave station in the second communication network on the lower side, the relay station A performs multiple access control of the second communication network such that a time at which the relay station B or the slave station is allowed for transmission comes after the information completion time. In addition, the relay station A reports the amount of information with the time, as an information completion time, at which the second communication network which is the lower network is allowed for transmission, to the first communication network which is the upper network where the relay station A operates as a slave station.

<Third Embodiment>
[Overall Configuration of a System]

Figure 17:
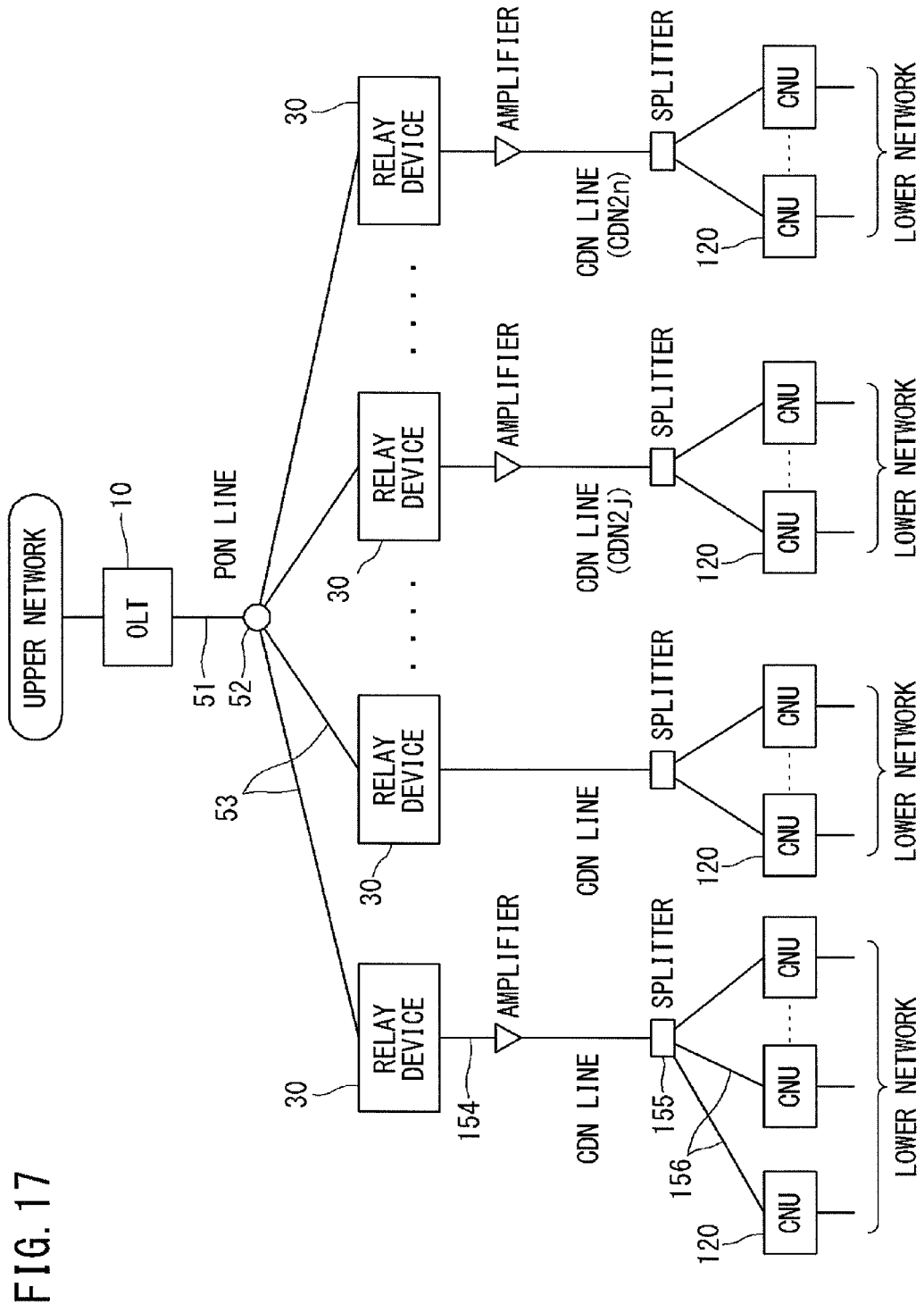
FIG. 17 is a diagram showing a connection mode of a communication system according to a third embodiment.

FIG. 17 is a diagram showing a connection mode of a communication system according to the third embodiment.

As shown in FIG. 17, in the communication system of the third embodiment, an upper-level network is composed of a PON (specifically, a GE-PON) using an optical fiber, and a lower-level network is composed of a CDN (Coaxial Distribution Network) using a coaxial cable (Coax).

In general, the CDN is composed of a network in which a CLT (Coax Line Terminal) which is a station side device is connected to a plurality of CNUs (Coax Network Units) which are home side devices in a one-to-many manner by split coaxial cables.

Hence, in the communication system of the third embodiment, in the lower-level network where a relay device 30 behaves as a CLT, a coaxial cable 154 is split into a plurality of branch lines 156 through a CATV splitter 155, and CNUs 120 are connected to the branch lines 156.

Therefore, an electrical signal (electromagnetic wave) in the downstream direction which is sent out by the relay device 30 behaving as a CLT is distributed to the respective branch lines 156, and an electrical signal (electromagnetic wave) in the upstream direction which is sent out by each CNU 120 is sent only to the relay device 30 behaving as a CLT.

The electrical signal is obtained by performing multi-level QAM modulation on an OFDM carrier, but is not limited thereto and known modulation techniques may be used. At this time, it is preferred to perform frequency multiplexing by changing carrier frequency band between a downstream signal and an upstream signal.

In such a CDN system, too, since registration of CNUs 120 and multiple access control in the upstream direction are performed, MPCP is used. Namely, although a CDN and a PON differ from each other in transmission medium, since their logical operations in the system are the same, the present invention can be applied.

Note that, for a multiplexing scheme for a downstream signal and an upstream signal in the CDN, a time division duplex (TDD) mode using the same carrier frequency may be used. In this case, upstream multiple access control is performed such that upstream communication is not performed during a period during which allocation is performed for the downstream direction.

As shown in the third embodiment of FIG. 17, in the communication system of the multi-level configuration according to the present invention, a second line on the lower-level side where the relay device 30 performs upstream multiple access control does not necessarily need to be a PON line and may be a CDN line.

In addition, in the third embodiment of FIG. 17, the system may be such that a first line on the upper-level side is also composed of a CDN line, or other communication lines (which may be a wireless line) are used for both of the upper and lower levels.

In the third embodiment, the configuration of a CNU 120 on the lower-level side is such that, in FIG. 3 showing the configuration of the ONU 20, the "PON line 2" is read as a CDN line and the "PON transmitting and receiving unit" is read as a "CDN transmitting and receiving unit".

The CDN transmitting and receiving unit 21 demodulates a modulated electrical signal received from the CDN line into a baseband signal and outputs the baseband signal to the reception processing unit 23, and modulates a baseband signal inputted from the transmission processing unit 22 and outputs the modulated signal to the CDN line.

In addition, in the third embodiment, the configuration of a relay device 30 (hereinafter, called a "PC relay device") that operates as a CLT of a lower-level system is such that, in FIG. 4 showing the configuration of the relay device 30 between PONs, the "PON line 2" is read as a "CDN line" and the "second PON transmitting and receiving unit" is read as a "second CDN transmitting and receiving unit".

In addition, the second CDN transmitting and receiving unit 38 of the PC relay device 30 demodulates a modulated electrical signal received from the CDN line into a baseband signal and outputs the baseband signal to the second reception processing unit 35, and modulates a baseband signal inputted from the second transmission processing unit 37 and outputs the modulated signal to the CDN line.

Note that, though not shown in FIG. 17, in the third embodiment, the configuration of a CLT of the upper-level system for when the upper-level system is a CDN is such that, in FIG. 2 showing the configuration of the OLT 10, the "PON line 1" is read as a "CDN line" and the "PON transmitting and receiving unit" is read as a "CDN transmitting and receiving unit".

The CDN transmitting and receiving unit 16 demodulates a modulated electrical signal received from the CDN line into a baseband signal and outputs the baseband signal to the reception processing unit 13, and modulates a baseband signal inputted from the transmission processing unit 15 and outputs the modulated signal to the CDN line.

Note that, as shown in FIG. 17, an amplifier for amplifying an electrical signal may be interposed in the midway of the coaxial cable 154 of the CDN line.

<Other Variants>

The scope of the present invention is indicated by the claims rather than by the above-described basic modes and embodiments (including the variants), and all changes that come within the range of equivalency of the claims and the configurations thereof are to be embraced therein.

Although some variants of the above-described basic modes are exemplified below, the variants can also be applied to the above-described embodiments.

In the above-described basic modes, the upper-level PON (PON 1) is symmetric 10G-EPON where both of the upstream and downstream transmission rates are 10G, and the lower-level PON is G-EPON. However, the upper-level PON (PON 1) may be symmetric 10G-EPON, and the lower-level PON may be asymmetric 10G-EPON where the downstream transmission rate is 10G and the upstream transmission rate is 1G (first variant). Alternatively, the upper-level PON (PON 1) may be asymmetric 10G-EPON, and the lower-level PON may be G-EPON (second variant).

For example, in the case of the above-described first variant, the difference in upstream transmission rate between the first PON transmitting and receiving unit 31 and the second PON transmitting and receiving unit 38 may be absorbed by the upstream buffer 40 of the relay device 30.

In the case of the above-described second variant, the difference in downstream transmission rate between the first PON transmitting and receiving unit 31 and the second PON transmitting and receiving unit 38 may be absorbed by the downstream buffer 41 of the relay device 30.

In the above-described basic modes, one ONU 20 is associated with one logical link in a lower-level PON. It is premised that even when a plurality of service classes are assumed, a plurality of queues associated with the service classes are formed in one logical link.

However, a plurality of logical links associated with the service classes may be formed for one ONU 20, too.

In such a case in which a plurality of logical links are assumed for one ONU 20, in the above-described first basic mode, for logical links belonging to the same service class, the logical link of the PON line 1 and the logical links of the PON line 2 may be allowed to have a one-to-many correspondence.

Likewise, in the above-described second basic mode, for logical links belonging to the same service class, the logical link of the PON line 1 and the logical links of the PON line 2 may be allowed to have a one-to-one correspondence.

In addition, the relay device 30 of the above-described basic modes may be provided with another path that demultiplexes a specific wavelength in the upper-level PON (PON 1) in the device and multiplexes an optical signal as it is in the lower-level PON.

At this time, optical power may be amplified by an optical amplifier, etc. The specific wavelength can be used for an OTDR test, video signal broadcasting, etc.

In addition, although in the above-described basic modes the lower-level PON is G-EPON, the lower-level PON may adopt a dual-rate PON which uses both G-EPON and 10G-EPON. In this case, since a G-EPON ONU 20 and a 10G-EPON ONU 20 coexist in the same lower-level PON, the relay device 30 determines a use rate according to the type of a registered ONU 20.

Furthermore, as the upper-level PON, in addition to transmitting and receiving means of 10G-EPON, transmitting and receiving means of G-EPON may be provided to the relay device 30, or the transmitting and receiving means of the 10G-EPON may also have the transmission and reception functions of the G-EPON, and one of them may be allowed to operate by setting.

In conjunction with the dual-rate support for the lower-level PON, the relay device 30 turns out to operate as a relay device of G-EPON or as a relay device of 10G-EPON in addition to the operation of the present invention. Thus, the application range of the relay device extends.

In addition, in the above-described basic modes, in the relay device 30, one control unit 34 performs processing on control frames for the upper-level PON (PON 1) and processing on control frames for the lower-level PON.

Furthermore, the above-described basic modes show an example in which regarding registration, removal, and an OAM loopback test, control messages for the upper-level PON (PON 1) and the lower-level PON are associated with each other. However, in addition thereto, control messages may be associated in the "sleep control", "notification and update of an encryption key", "ONU management", etc., of ONUs 20.

For example, in the case of performing sleep control in the above-described first basic mode, when a relay device 30 receives a sleep instruction from the OLT 10, the relay device 30 transmits a sleep instruction to ONUs 20 under the control thereof, on condition that there is no transmit data. Then, when the relay device 30 obtains sleep responses of Ack from all ONUs 20, the relay device 30 sends a sleep response thereof back to the OLT 10.

In this case, the transmission operation of the ONUs 20 to their lower-level PONs can be put to sleep, enabling to achieve the power savings of the ONUs 20. Furthermore, when all ONUs 20 go to sleep, the transmission operation of the relay device 30 to the upper-level PON can be put to sleep, enabling to achieve the power savings of the relay device 30.

In addition, in the case of performing sleep control in the above-described second basic mode, a relay device 30 relays a sleep instruction from the OLT 10 to a corresponding logical link, and reports a sleep response acknowledge/ unacknowledge result from an ONU 20 directly to the OLT 10. The relay device 30 performs its sleep operation during the overlapping sleep times of ONUs 20 under the control thereof.

In this case, not only the transmission operation of the ONUs 20 to their lower-level PONs, but also the reception operation of the ONUs 20 from their lower-level PONs can be put to sleep, enabling to further improve the power-saving effect of the ONUs 20. Furthermore, during the period during which the sleeps of all ONUs 20 overlap one another, not only the transmission operation of the relay device 30 to the upper-level PON, but also the reception operation of the relay device 30 from the upper-level PON can be put to sleep, enabling to further improve the power-saving effect of the relay device 30.

In addition, in the above-described basic modes, the relay device 30 may include a plurality of lower-level PONs. In this case, the LLID resolution table 36 resolves a lower-level PON and LLIDs in that PON as a unit.

REFERENCE SIGNS LIST

10: STATION SIDE DEVICE (OLT: MASTER STATION DEVICE)
20: HOME SIDE DEVICE (ONU: SLAVE STATION DEVICE)
30: RELAY DEVICE
31: FIRST PON TRANSMITTING AND RECEIVING UNIT (FIRST TRANSMITTING AND RECEIVING UNIT)
32: FIRST TRANSMISSION PROCESSING UNIT (RELAY PROCESSING UNIT)
33: FIRST RECEPTION PROCESSING UNIT (RELAY PROCESSING UNIT)
34: CONTROL UNIT

35: SECOND RECEPTION PROCESSING UNIT (RELAY PROCESSING UNIT)
36: LLID RESOLUTION TABLE
37: SECOND TRANSMISSION PROCESSING UNIT (RELAY PROCESSING UNIT)
38: SECOND PON TRANSMITTING AND RECEIVING UNIT (SECOND TRANSMITTING AND RECEIVING UNIT)
39: FIRST UPSTREAM BUFFER (FOR CONTROL FRAMES)
40: SECOND UPSTREAM BUFFER (FOR USER FRAMES)
41: DOWNSTREAM BUFFER
42: BUFFER FOR A LOOP

The invention claimed is:

1. A relay device comprising:
a first transmitting and receiving unit that performs transmission and reception of signals to/from an upper-level first line;
a second transmitting and receiving unit that performs transmission and reception of signals to/from a lower-level second line;
a relay processing unit that relays a downstream frame received by the first transmitting and receiving unit to the second transmitting and receiving unit, and relays an upstream frame received by the second transmitting and receiving unit to the first transmitting and receiving unit; and
a processor for a control unit that follows upstream multiple access control performed by a station side device in the first line, for transmission of the upstream frame to be transmitted by the first transmitting and receiving unit to the station side device, and independently performs upstream multiple access control for reception of the upstream frame received by the second transmitting and receiving unit from a home side device in the second line, wherein
the control unit reports an amount of data that the home side device in the second line is or will be allowed to transmit, to the station side device in the first line before the data arrives at the second transmitting and receiving unit.

2. The relay device according to claim 1, wherein
the relay processing unit has an upstream buffer that buffers upstream data, and
the control unit determines an amount of data that the home side device will be allowed to transmit, and then, makes a write reservation in the upstream buffer for the amount of data and determines an amount of data to be reported to the station side device, based on an amount of buffer for which the write reservation is made.

3. The relay device according to claim 1, wherein the relay device is connected to the station side device that performs centralized dynamic bandwidth allocation (DBA), and performs centralized DBA having same cycles as the centralized DBA and having a phase matching that of the centralized DBA.

4. The relay device according to claim 1, wherein the relay device is connected to the station side device that performs centralized dynamic bandwidth allocation (DBA), and performs centralized DBA having same cycles as the centralized DBA and having a phase delayed by predetermined allowance time from that of the centralized DBA.

5. A station side device performing distributed dynamic bandwidth allocation (DBA) and connected to a relay device according to claim 1 performing distributed DBA, determines a reception start time for bandwidth to be allocated according to a bandwidth report received from a given logical link of a first line, based on a reception time of the bandwidth report, an upper limit value of a gate delay in a second line, and an upper limit value of back-and-forth propagation time of the second line.

6. A communication system in which a first communication network having a master station device performing multiple access control of a polling scheme is connected to a second communication network having a relay device performing multiple access control of a polling scheme, through the relay device, wherein
the master station device includes:
a transceiver connected to the first communication network, and
a control unit that processes electrical signals input to or output from the transceiver,
the relay device includes:
a first transceiver connected to the first communication network,
a second transceiver connected to the second communication network,
a control unit that processes electrical signals input to or output from the first and second transceiver, and
a relay processing unit that relays a downstream frame received by the first transceiver to the second transceiver, and relays an upstream frame received by the second transceiver to the first transceiver, and
the control unit of the relay device inputs, to the first transceiver, a report message in order to report an amount of data to be for transmission in the second communication network, to the master station device, the report message being input before the data arrives at the relay device.

7. A communication system in which a first communication network having a master station device performing multiple access control of a polling scheme is connected to a second communication network having a relay device performing multiple access control of a polling scheme, through the relay device, wherein
the master station device includes:
a transceiver connected to the first communication network, and
a control unit that processes electrical signals input to or output from the transceiver,
the relay device includes:
a first transceiver connected to the first communication network,
a second transceiver connected to the second communication network,
a control unit that processes electrical signals input to or output from the first and second transceiver, and
a relay processing unit that relays a downstream frame received by the first transceiver to the second transceiver, and relays an upstream frame received by the second transceiver to the first transceiver, and
when the control unit of the relay device inputs, to the first transceiver, a report message in order to report a predetermined amount of data to the master station device, the control unit of the relay device includes an information completion time to the report message, the information completion time representing a time at which the amount of data reported will be actually accomplished, and
the processor control unit of the master station device inputs, to the transceiver, a gate message in order to allocate transmission allowance corresponding to the amount of data reported by the relay device, after the information completion time.

8. A communication method in which a master station device in a first communication network performs multiple access control of a polling scheme on a relay device, and the relay device performs multiple access control of a polling scheme on a slave station device in a second communication network, wherein the master station device includes:
- a transceiver connected to the first communication network, and
- a control unit that processes electrical signals input to or output from the transceiver, the relay device includes:
- a first transceiver connected to the first communication network,
- a second transceiver connected to the second communication network,
- a control unit that processes electrical signals input to or output from the first and second transceiver, and
- a relay processing unit that relays a downstream frame received by the first transceiver to the second transceiver, and relays an upstream frame received by the second transceiver to the first transceiver, and inputting, by the control unit of the relay device, to the first transceiver, a report message in order to report an amount of data to be allowed for transmission in the second communication network, to the master station device, the report message being input before the data arrives at the relay device.

9. A communication method in which a master station device in a first communication network performs multiple access control of a polling scheme on a relay device, and the relay device performs multiple access control of a polling scheme on a slave station device in a second communication network, wherein the master station device includes:
- a transceiver connected to the first communication network, and
- a control unit that processes electrical signals input to or output from the transceiver, the relay device includes:
- a first transceiver connected to the first communication network,
- a second transceiver connected to the second communication network,
- a control unit that processes electrical signals input to or output from the first and second transceiver, and
- a relay processing unit that relays a downstream frame received by the first transceiver to the second transceiver, and relays an upstream frame received by the second transceiver to the first transceiver, and when the control unit of the relay device inputs, to the first transceiver, a report message in order to report a predetermined amount of data to the master station device, including, by the control unit of the relay device, an information completion time to the report message, the information completion time representing a time at which the amount of data reported will be actually accomplished, and inputting, by the control unit of the master station device, to the transceiver, a gate message in order to allocate transmission allowance corresponding to the amount of data reported by the relay device, after the information completion time.

* * * * *